(12) United States Patent
Zhai et al.

(10) Patent No.: US 9,471,220 B2
(45) Date of Patent: Oct. 18, 2016

(54) POSTURE-ADAPTIVE SELECTION

(71) Applicant: Google Inc., Mountain View, CA (US)

(72) Inventors: Shumin Zhai, Los Altos, CA (US); Yu Ouyang, San Jose, CA (US); Ying Yin, Cambridge, MA (US)

(73) Assignee: Google Inc., Mountain View, CA (US)

( * ) Notice: Subject to any disclaimer, the term of this patent is extended or adjusted under 35 U.S.C. 154(b) by 369 days.

(21) Appl. No.: 14/030,742

(22) Filed: Sep. 18, 2013

(65) Prior Publication Data

US 2014/0082545 A1 Mar. 20, 2014

Related U.S. Application Data

(60) Provisional application No. 61/702,678, filed on Sep. 18, 2012.

(51) Int. Cl.
| | | |
|---|---|---|
| *G06F 3/041* | (2006.01) | |
| *G06F 3/048* | (2013.01) | |
| *G06F 3/0488* | (2013.01) | |
| *G06F 1/16* | (2006.01) | |
| *G06F 3/023* | (2006.01) | |

(52) U.S. Cl.
CPC ......... *G06F 3/04886* (2013.01); *G06F 1/1694* (2013.01); *G06F 3/0237* (2013.01); *G06F 3/0418* (2013.01); *G06F 3/0488* (2013.01); *G06F 3/04883* (2013.01)

(58) Field of Classification Search
CPC ............. G06F 3/04886; G06F 3/0488; G06F 3/04883; G06F 3/0418; G06F 3/0237; G06F 1/1694
See application file for complete search history.

(56) References Cited

U.S. PATENT DOCUMENTS

| | | |
|---|---|---|
| 5,075,896 A | 12/1991 | Wilcox et al. |
| 5,801,941 A | 9/1998 | Bertram |
| 6,286,064 B1 | 9/2001 | King et al. |
| 6,292,179 B1 | 9/2001 | Lee |
| 6,542,170 B1 | 4/2003 | Williams et al. |
| 6,801,190 B1 | 10/2004 | Robinson et al. |
| 6,983,247 B2 | 1/2006 | Ringger et al. |
| 7,030,863 B2 | 4/2006 | Longe et al. |
| 7,042,443 B2 | 5/2006 | Woodard et al. |

(Continued)

OTHER PUBLICATIONS

Aulagner et al., "FloodKey: increasing software keyboard keys by reducing needless ones without occultation," In Proceedings of the 10th WSEAS international conference on Applied Computer Science, ACS, 2010, pp. 412-417.

(Continued)

*Primary Examiner* — Aaron Lowenberger
(74) *Attorney, Agent, or Firm* — Shumaker & Sieffert, P.A.

(57) ABSTRACT

In one example a computing device includes at least one processor, wherein the at least one processor may be configured to output for display, a graphical keyboard comprising a plurality of keys. The at least one processor may be configured to receive an indication of an input detected at a presence-sensitive input device operatively coupled to the computing device; and responsive to receiving the indication, determine an input posture of the input, wherein the input posture represents an orientation of the computing device in relation to an input unit used to provide the input. The at least one processor may be configured to select, based at least in part on the input posture, a spatial model that is used for determining a probability that at least one of the one or more of the plurality of keys has been selected.

15 Claims, 6 Drawing Sheets

(56) References Cited

U.S. PATENT DOCUMENTS

| | | | |
|---|---|---|---|
| 7,075,520 B2 | 7/2006 | Williams | |
| 7,088,345 B2 | 8/2006 | Robinson et al. | |
| 7,098,896 B2 | 8/2006 | Kushler et al. | |
| 7,145,554 B2 | 12/2006 | Bachmann | |
| 7,151,530 B2 | 12/2006 | Roeber et al. | |
| 7,199,786 B2 | 4/2007 | Suraqui | |
| 7,250,938 B2 | 7/2007 | Kirkland et al. | |
| 7,251,367 B2 | 7/2007 | Zhai | |
| 7,277,088 B2 | 10/2007 | Robinson et al. | |
| 7,453,439 B1 | 11/2008 | Kushler et al. | |
| 7,508,324 B2 | 3/2009 | Suraqui | |
| 7,593,552 B2* | 9/2009 | Higaki et al. | 382/118 |
| 7,706,616 B2 | 4/2010 | Kristensson et al. | |
| 7,716,579 B2 | 5/2010 | Gunn et al. | |
| 7,750,891 B2 | 7/2010 | Stephanick et al. | |
| 7,809,019 B2 | 10/2010 | Kraus | |
| 7,880,730 B2 | 2/2011 | Robinson et al. | |
| 7,886,233 B2 | 2/2011 | Rainisto et al. | |
| 7,921,361 B2 | 4/2011 | Gunn et al. | |
| 8,036,878 B2 | 10/2011 | Assadollahi | |
| 8,135,582 B2 | 3/2012 | Suraqui | |
| 8,928,593 B2 | 1/2015 | Jian | |
| 2005/0171783 A1 | 8/2005 | Suominen | |
| 2006/0119582 A1 | 6/2006 | Ng et al. | |
| 2006/0173674 A1 | 8/2006 | Nakajima et al. | |
| 2006/0176283 A1 | 8/2006 | Suraqui | |
| 2008/0316183 A1 | 12/2008 | Westerman et al. | |
| 2009/0007001 A1 | 1/2009 | Morin et al. | |
| 2009/0231282 A1* | 9/2009 | Fyke | 345/169 |
| 2010/0131447 A1 | 5/2010 | Creutz et al. | |
| 2010/0289752 A1* | 11/2010 | Birkler | G06F 1/1626 345/173 |
| 2010/0315266 A1 | 12/2010 | Gunawardana et al. | |
| 2011/0063231 A1 | 3/2011 | Jakobs et al. | |
| 2011/0128230 A1 | 6/2011 | Griffin | |
| 2012/0036469 A1 | 2/2012 | Suraqui | |
| 2012/0154298 A1 | 6/2012 | Wu et al. | |
| 2012/0166995 A1 | 6/2012 | McAleer | |
| 2012/0260207 A1 | 10/2012 | Treskunov et al. | |
| 2012/0304067 A1* | 11/2012 | Han et al. | 715/728 |
| 2012/0324381 A1 | 12/2012 | Cohen et al. | |
| 2013/0002565 A1 | 1/2013 | Tumanov et al. | |
| 2013/0009896 A1 | 1/2013 | Zaliva | |
| 2013/0067382 A1* | 3/2013 | Townsend et al. | 715/773 |
| 2013/0222247 A1 | 8/2013 | Liu et al. | |

OTHER PUBLICATIONS

Azenkot et al., "Touch Behavior with Different Postures on Soft Smartphone Keyboards," 14 international Conference on Human-Computer Interaction with Mobile Devices and Services, 2012, 10 pages.

Brewster et al., "Tactile Feedback for Mobile Interactions," Glasgow Interactive Systems Group, Department of Computing Science, CHI 2007, Apr. 28-May 3, 2007, 4 pp.

Faraj et al., "BigKey: A Virtual Keyboard for Mobile Devices," Human-Computer Interaction, Part III, HCII, 2009, LNCS 5612, pp. 3-10.

Findlater et al., "From Plastics to Pixels: In Search of Touch-Typing Touchscreen Keyboards," Interactions, May-Jun. 2012, 6 pp.

Findlater et al., "Personalized Input: Improving Ten-Finger Touchscreen Typing Through Automatic Adaptation," Proceedings of the SIGCHI Conference on Human Factors in Computing Systems, May 5-10, 2012, 10 pages.

Findlater, et al., "In Search of Touch-Typing Touchscreen Keyboards," College of Information Studies, University of Maryland, College Park, accessed on Aug. 22, 2012, 36 pp.

Goel et al., "Walk Type: Using Accelerometer Data to Accommodate Situational Impairments in Mobile Touch Screen Text Entry," CHI 2012, May 5-10, 2012, Austin, Texas, USA, pp. 2687-2696.

Goodman et al., "Language Modeling for Soft Keyboards," In Proceedings of the 7th International Conference on Intelligent User Interfaces, Jan. 13-16, 2002, pp. 194-195.

Gunawardana et al., "Usability Guided Key-Target Resizing for Soft Keyboards," In Proceedings of the 15th international Conference on Intelligent User interfaces, ACM, 2010, pp. 111-118.

Henze et al., "100,000,000 Taps: Analysis and Improvement of Touch Performance in the Large", MobileHCI 2011, 10 pp.

Himberg et al., "On-Line Personalization of a Touch Screen Based Keyboard," Proceedings of the 8th International Conference on Intelligent User Interfaces, Jan. 12-15, 2003, 8 pages.

Hoggan et al., "Investigating the Effectiveness of Tactile Feedback for Mobile Touchscreens," Proceedings of the SIGCHI Conference on Human Factors in Computing Systems, Apr. 5-10, 2008, 10 pages.

Kristensson et al., "Relaxing Typing Precision by Geometric Pattern Matching," In Proceedings of the 10th International Conference on Intelligent User Interfaces, IUT, Jan. 9-12, 2005, pp. 151-158.

Kristensson et al., "SHARK2: A Large Vocabulary Shorthand Writing System for Pen-based Computers ," Proceedings of the 17th Annual ACM Symposium on User Interface Software and Technology, Oct. 24-27, 2004, 10 pages.

Lomas, "Hey Apple, What The NExt iPhone Really, Really Needs Is a Much Better Keyboard," Retrieved from techcrunch.com/2013/04/21/the-iphone-keyboard-stinks/?, Apr. 22, 2013, 6 pp.

MacKenzie et al., "The Design and Evaluation of a High-Performance Soft Keyboard," In Proceedings of the SIGHI Conference on Human Factors in Computing Systems: The CHI is the Limit, CHI 1999, pp. 25-31.

Magnien et al, "Mobile Text Input with Soft Keyboards: Optimization by Means of Visual Clues," Mobile Human-Computer Interaction—MobileHCI 2004, 2004, 5 pages.

Rabin et al, "Tactile Feedback Contributes to Consistency of Finger Movements During Typing," Exp Brain Res, Feb. 20, 2004, 8 pages.

Rashid et al, "Relative Keyboard Input System," Proceedings of the 13th International Conference on Intelligent User Interfaces, Jan. 13-16, 2008, 4 pp.

Rudchenko et al., "Text Text Revolution: A Game that Improves Text Entry on Mobile Touchscreen Keyboards," Proceedings of the 9th International Conference on Pervasive Computing, 2011, 8 pp.

Shahbudin et al., "Adaptive-Neuro Fuzzy Inference System for Human Posture Classification Using a Simplified Shock Graph," Journal of Information & Computational Science 9:8, 2012, 14 pp.

U.S. Appl. No. 60/430,338, by Daniel Suraqui, filed Nov. 29, 2002.

U.S. Appl. No. 60/505,724, by Daniel Suraqui, filed Sep. 22, 2003.

Zhai et al., "Movement Model, Hits Distribution and Learning in Virtual Keyboarding," Proceedings of the SIGCHI Conference on Human Factors in Computing Systems, Apr. 20-25, 2002, 8 pp.

Zhai et al., "The Metropolis Keyboard—An Exploration of Quantitative Techniques for Virtual Keyboard Design," Proceedings of the 13th Annual ACM Symposium on User Interface Software and Technology, Nov. 5-8, 2000, 10 pp.

International Search Report and Written Opinion from International Application No. PCT/US2013/060378, mailed Jul. 8, 2014, 10 pages.

International Preliminary Report on Patentability from international application No. PCT/US2013/060378, dated Apr. 2, 2015, 8 pgs.

* cited by examiner

POSTURE-ADAPTIVE SELECTION

This application claims the benefit of U.S. Provisional Application No. 61/702,678, filed Sep. 18, 2012, the entire content of which is hereby incorporated by reference.

BACKGROUND

Some computing devices (e.g., mobile phones, tablet computers, etc.) may provide a graphical keyboard as part of a graphical user interface for text entry using a presence-sensitive display (e.g., a screen). For instance, a presence-sensitive display of a computing device may output a graphical (or "soft") keyboard that enables the user to enter data by indicating (e.g., by tapping, sliding, and/or swiping on or over) keys displayed at the presence-sensitive display.

In some cases, the computing device may present a graphical keyboard with which the user interacts by tapping individual keys of the keyboard or essentially gesturing out a word by sliding his or her finger over the regions associated with the keys. In this way, graphical keyboards provide an input method that allows the user to enter characters, words, or a group of words by one or more gestures. As such, a graphical keyboard may allow the user to achieve a certain degree of efficiency by quickly and accurately entering text. A computing device that provides a graphical keyboard may utilize word prediction, auto-correction, and/or suggestion techniques for determining a word from a user input.

However, graphical keyboards may have certain drawbacks. For example, a computing device may generate touch events when a user performs a gesture at a presence-sensitive screen that outputs a continuous gesture graphical keyboard. The touch events may include representations of one or more different locations of the presence-sensitive input device that are traversed by the user's finger when performing a tap or continuous gesture. In some examples, a user may provide such input in different positions based on different postures with which the user provides the input (e.g., tapping with two thumbs and/or two fingers of different hands (bimodal) versus tapping with a single finger (single tap)). As such, the graphical keyboard may not correctly determine the keys and/or words intended by the user. Consequently the computing device may select one or more words and/or characters that the user did not intend to enter, thereby resulting in inaccurate text entry that reduces the speed at which the user may interact with the computing device.

SUMMARY

In one example, a method includes outputting, by a computing device and for display, a graphical keyboard comprising a plurality of keys. The method may also include receiving, by the computing device, an indication of an input detected at a presence-sensitive input device operatively coupled to the computing device. The method may also include, in response to receiving the indication, determining, by the computing device, an input posture of the input, wherein the input posture represents an orientation of the computing device in relation to an input unit used to provide the input. The method may also include selecting, based at least in part on the input posture and by the computing device, a spatial model that is used for determining a probability that at least one of the one or more of the plurality of keys has been selected.

In one example, a computer-readable storage medium encoded with instructions that, when executed, cause one or more processors of a computing device to perform operations including outputting, by a computing device and for display, a graphical keyboard comprising a plurality of keys. The computer-readable storage medium may be further encoded with instructions that cause one or more processors of a computing device to perform operations including receiving, by the computing device, an indication of an input detected at a presence-sensitive input device. The computer-readable storage medium may be further encoded with instructions that cause one or more processors of a computing device to perform operations including in response to receiving the indication, determining, by the computing device, an input posture of the input, wherein the input posture represents an orientation of the computing device in relation to an input unit used to provide the input. The computer-readable storage medium may be further encoded with instructions that cause one or more processors of a computing device to perform operations including selecting, based at least in part on the input posture and by the computing device, a spatial model that is used for determining a probability that at least one of the one or more of the plurality of keys has been selected.

In one example, a computing device includes at least one processor, wherein the at least one processor may be configured to outputting for display, a graphical keyboard comprising a plurality of keys. In some examples, the at least one processor may be configured to receive an indication of an input detected at a presence-sensitive input device. In some examples, the at least one processor may be configured to, in response to receiving the indication, determine an input posture of the input, wherein the input posture represents an orientation of the computing device in relation to an input unit used to provide the input. In some examples, the at least one processor may be configured to select, based at least in part on the input posture, a spatial model that is used for determining a probability that at least one of the one or more of the plurality of keys has been selected.

The details of one or more examples of the disclosure are set forth in the accompanying drawings and the description below. Other features, objects, and advantages will be apparent from the description and drawings, and from the claims.

DETAILED DESCRIPTION

Techniques of the present disclosure are directed to providing improved prediction of selected keys of a keyboard based on user input posture. By selecting spatial models based on user input posture, techniques of the disclosure may enable a computing device to achieve improved character, word, and/or phrase level recognition and prediction. In some examples, techniques of the disclosure allow the computing device to determine a posture with which a user is selecting keys of a graphical keyboard, e.g., by tapping, gesturing, or otherwise providing input using a user-interface device. Techniques of the disclosure may be applied by a computing device to determine, for example, a posture in which a user is holding the mobile computing device in one hand and gesturing with a single finger using a second, different hand. Using a different posture, the user may hold a mobile computing device with both hands and tap keys with his or her thumbs, and many other postures are possible.

A mobile computing device that implements techniques of the present disclosure selects one or more spatial models using the determined posture to predict which key the user has selected. In some examples, a mobile computing device uses spatial models to convert one or more touch points at a user interface device into a probability that a particular key of a graphical keyboard has been selected by a user. Because the touch location of a user input for a given key may vary depending on the posture with which a user enters the user input, techniques of the disclosure can be used to improve the probability estimation of the intended key for a given touch point.

In some examples, techniques of the present disclosure employ a hierarchical adaptive spatial model with back-offs. The hierarchical model may be adaptive and include sub-models based on posture, key, and user information. That is, in some examples, information identifying one or more of a posture, user, and/or key can be used to select one or more spatial models that more accurately predict the key selected by the user. Each spatial model may include a probability distribution to determine a probability that a touch input corresponds to a key of a graphical keyboard, wherein the probability distribution accounts for bias based on but not limited to one or more of input posture, key, and user information. Techniques of the disclosure can further use one or more back-off techniques, such that if a mobile computing determines an insufficient amount or confidence level of information for posture, user, or key, the hierarchical model can provide a key prediction based on information for which there is a sufficient confidence level or amount of information. In this way, the hierarchical model may use more portions of the hierarchical model as the amount of information to make a key prediction increases for the respective portions of the hierarchical model.

Figure 1:
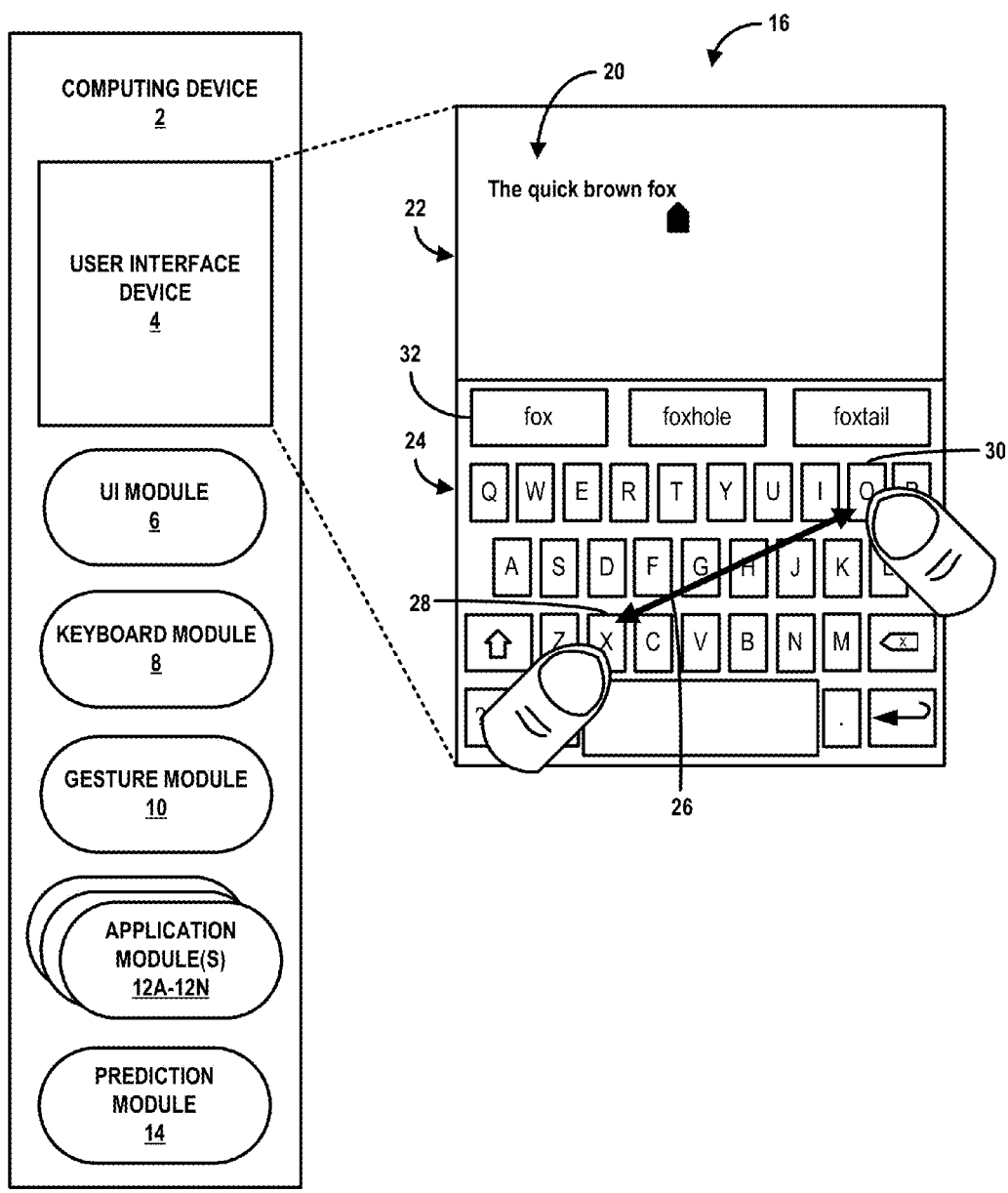
FIG. 1 is a block diagram illustrating an example computing device that may implement techniques to provide improved prediction of selected keys of a keyboard based on user input posture, in accordance with one or more techniques of the present disclosure.

FIG. 1 is a block diagram illustrating an example computing device 2 that may implement techniques to provide improved prediction of selected keys of a keyboard based on user input posture, in accordance with one or more techniques of the present disclosure. In some examples, computing device 2 may be associated with a user. A user associated with computing device 2 may interact with computing device 2 by providing various user inputs to the computing device. In some examples, a user may have one or more accounts with one or more services, such as a social networking service and/or telephone service, and the accounts may be registered with computing device 2.

Figure 2:
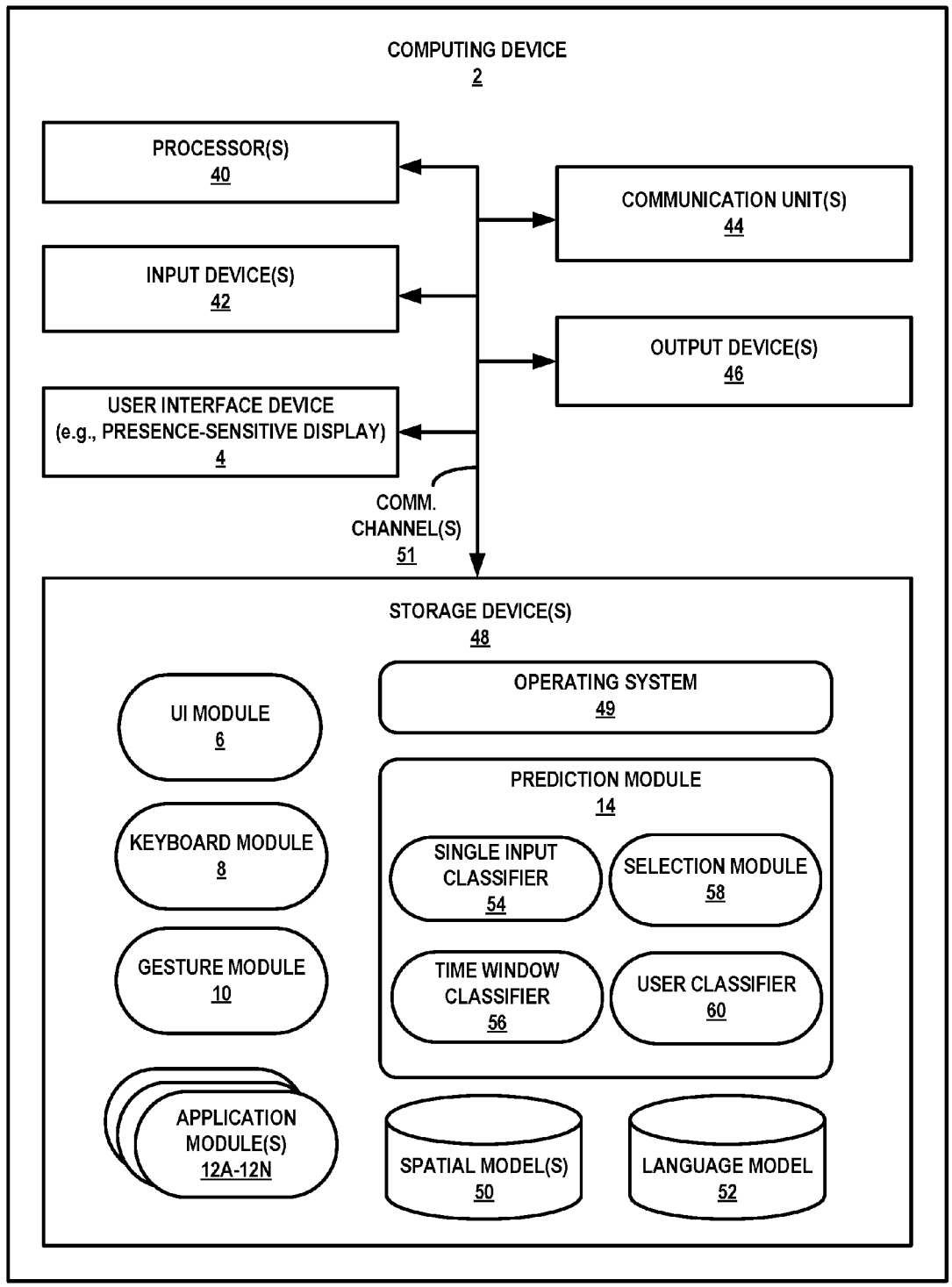
FIG. 2 is a block diagram illustrating further details of one example of a computing device shown in FIG. 1, in accordance with one or more aspects of the present disclosure.

Examples of computing device 2 may include, but are not limited to, portable or mobile devices such as mobile phones (including smart phones), laptop computers, desktop computers, tablet computers, smart television platform, personal digital assistants (PDAs), servers, mainframes, etc. As shown in the example of FIG. 1, computing device 2 may be a smartphone. Computing device 2, in some examples, can include a user interface (UI) device 4, UI module 6, keyboard module 8, gesture module 10, application modules 12A-12N ("application modules 12"), and prediction module 14. Other examples of a computing device 2, e.g., as shown in FIG. 2, that implement techniques of the disclosure may include additional components not shown in FIG. 1.

Computing device 2 may include UI device 4. In some examples, UI device 4 is configured to receive tactile, audio, or visual input. Examples of UI device 4, as shown in FIG. 1, may include a presence-sensitive input device, touch-sensitive display, a presence-sensitive display, optical-sensitive display, or any other type of device for receiving input. UI device 4 may output content such as graphical user interface (GUI) 16 for display. In the example of FIG. 1, UI device 4 may be a presence-sensitive display that can display graphical user interface 16 and receive input from a user using capacitive, inductive, and/or optical detection at or near the presence sensitive display.

As shown in FIG. 1, computing device 2 may include user interface (UI) module 6. UI module 6 may perform one or more functions to receive indications of input, such as receiving indications of user input from UI device 4, and sending indications of such input to other components associated with computing device 2, such as application modules 12. UI module 6 may also receive data from components of computing device 2 or components operably coupled to computing device 2. Using the data, UI module 6 may cause other components associated with computing device 2, such as UI device 4, to provide output based on the data. For instance, UI module 6 may receive data from application module 8 that causes UI device 4 to display GUIs 10, 18, and 24.

Computing device 2, in some examples, includes keyboard module 8. Keyboard module 8 may include functionality to generate for display, a graphical keyboard. Keyboard module 8 also receives and/or processes input data, such as indications of input received at a graphical keyboard to select one or more keys. For example, keyboard module 8 may receive data representing inputs of certain taps, keystrokes, gestures, etc., from UI module 6 that were inputted by a user as tap gestures and/or continuous swiping gestures via a graphical keyboard displayed at UI device 4. Keyboard module 8 may process the received keystrokes and determine selected characters, words, strings, etc., based on input features such as, received input locations, input duration, input speed, etc. Keyboard module 8 may also function to send character, word, and/or character string data to other components associated with computing device 2, such as application modules 12, gesture module 10, keyboard, UI module 6, etc. That is, keyboard module 8 may, in various examples, receive input data from UI module 6, process the input data to determine characters, text, strings, etc., and provide the data to application modules 12.

As shown in FIG. 1, computing device 2 may also include gesture module 10. In some examples, gesture module 10 may be configured to receive gesture data from UI module 6 and process the gesture data. For instance, gesture module 10 may receive data indicating a gesture input by a user at UI device 4. Gesture module 10 may determine that the input gesture corresponds to a typing gesture, a cursor movement gesture, a cursor area gesture, or other gesture. In some examples, gesture module 10 determines one or more alignment points that correspond to locations of UI device 4 that are touched or otherwise detected in response to a user gesture. In some examples, gesture module 10 can determine one or more features associated with a continuous gesture, such as the Euclidean distance between two alignment points, the length of a gesture path, the direction of a gesture, the curvature of a gesture path, and maximum curvature of a gesture between alignment points, speed of the gesture, etc. A continuous gesture may be a gesture that begins at a first location continues while being detected by computing device 2 to a second, different location of UI device 4, such that the continuous gesture is no longer detected upon reaching the second, different location. Gesture module 10 may send processed data to other components of computing device 2, such as application modules 12, keyboard module 8, prediction module 14, etc.

Computing device 2, in some examples, includes one or more application modules 12. Application modules 12 may include functionality to perform any variety of operations on computing device 2. For instance, application modules 12 may include a word processor, spreadsheet, web browser, multimedia player, server application, operating system, distributed computing application, graphic design application, video editing application, web development application, notification application etc. As described in the example of FIG. 1, application module 12A may include functionality of an email application that displays graphical content. Such graphical content may include a text editor control 22 and graphical keyboard 24, which are each included in GUI 16. In the example of FIG. 1, application module 12A may enable a user to read email, compose and send, email, etc.

As shown in FIG. 1, GUI 16 may be a user interface generated by one or more of keyboard module 8 and application module 12A that allows a user to interact with computing device 2. UI 16 may include graphical content. Graphical content, generally, may be any visually displayable representation in GUI 16. Examples of graphical content may include graphical objects, text, images, a group of moving images, characters, symbols, etc. As shown in FIG. 1, GUI 16 includes a text editor control 22 and graphical keyboard 24.

As shown in FIG. 1, GUI 16 may be user interface generated by application module 12A that allows a user to interact with computing device 2. GUIs 14 may include graphical keyboard 24 and/or text editor control 22. As shown in FIG. 1, text editor control 22 may display text content entered by a user, generated by computing device 2, and/or received by computing device 2 from a another computing device that is operably coupled to computing device 2. For purposes of illustration in FIG. 1, text content 20 may include "The quick brown fox." UI module 6 may cause UI device 4 to display text editor control 22 with the included text content.

Graphical keyboard 24 may be displayed by UI device 4 as a set of selectable keys. Keys may represent a single character from a character set (e.g., letters of the English alphabet), or may represent combinations of characters. One example of a graphical keyboard may include a traditional "QWERTY" keyboard layout. Other examples may contain characters for different languages, different character sets, or different character layouts. As shown in the example of FIG. 1, graphical keyboard 24 includes a version of the traditional "QWERTY" keyboard layout for the English language providing character keys as well as various keys (e.g., the "up arrow" key that provide "shift" functionality) providing other functionality. Example keys include "O" key 30 and "X" key 28. In some examples, graphical keyboard 24 includes one or more word suggestions, such as word suggestion 32 that includes the word "fox."

In accordance with techniques of the disclosure, computing device 2 may implement a prediction module 14 to improve the prediction accuracy of user selections at keyboard 24. Prediction module 14, as described in this disclosure, determines a posture with which a user selects one or more keys of graphical keyboard 24. Based on the determined posture of a user, prediction module 14 may identify a spatial model associated with the posture to predict one or more probable keys of keyboard 24 that the user has intended to select. Prediction module 14 may determine, based at least in part on the at least one spatial model, a spatial model score that indicates a probability a key of the plurality of keys has been selected. As further described herein, prediction module 14 and keyboard module 8 may determine, based at least in part on the spatial model score, a word included in a lexicon and the word for display, in some examples.

As illustrated in FIG. 1, UI device 4 receives an indication of an input that is proximate to one or more of the plurality of keys of graphical keyboard 24. For instance, a user may perform one or more tap and/or continuous gestures at UI device 4. UI module 6 may send data from UI device 4 to gesture module 10, which in turn determines one or more locations of UI device 4 that are traversed by the one or more gestures. Based on the data, gesture module 10 can determine input information that indicates a shape of the gesture path, locations of UI device 4 traversed by the one or more swipe gestures, etc. Prediction module 14 may receive the input information from gesture module 10.

In response to receiving the information, prediction module 14 determines an input posture of the input. An example "two-thumb" input posture may include the user holding computing device 2 with left and right hands. The user may provide input at UI device 4 by using thumbs of his or her respective right and left hands to gesture, tap, or otherwise indicate user input at UI device 4. In a different "one-finger" input posture, the user may hold computing device 2 with one of the user's left or right hand. Using the remaining hand that is not holding computing device 2, the user may provide input at UI device 4, e.g., by tapping or gesturing at UI device 4 using a finger of the remaining hand. The two input postures described above are exemplary, and prediction module 14 may determine other, different postures in some examples.

Prediction module 14, in some examples, determines which input posture a user is using based on an orientation of a device using an accelerometer of computing device 2. In other examples, prediction module 14 determines which input posture a user is using to provide input, based on the time elapsed between two inputs and the distance between two input detected at UI device 4. For instance, consecutive inputs at UI device 4 occurring at longer distances apart but over shorter durations may indicate higher probabilities of a two-thumb input posture. Consecutive inputs occurring at longer distances apart at UI device 4, but over longer durations, however, may indicate higher probabilities of one-finger input posture. That is, inputs performed using one-finger input posture may follow that the time required to provide an input at a target location of UI device 4 is a function of the distance from a starting location to the input to the target location and the size of the target location. In contrast, inputs performed using two-thumb input posture may not follow that the time required to provide an input at a target location of UI device 4 is a function of the distance from a starting location to the input to the target location and the size of the target location.

In the example of FIG. 1, the user may provide input to computing device 2 using a two-thumb input posture. Using the two-thumb input posture, the user may provide one or more gestures to enter the word "fox." For instance, the user may use his or her right thumb to provide a first input at a first location of UI device 4 proximate to "O" key 30 and subsequently use his or her left thumb to provide a second input at a second location of UI device 4 proximate to "X" key 28. Prediction module 14 may receive information from gesture module 10 that indicates, for example, a first time at which the first input was provided and a second time at which the second input was provided. Prediction module 14 may also receive information from gesture module 10 that indicate alignment points at which gestures were detected to provide the first and second inputs. The alignment points may include coordinates that correspond to locations of UI device 4 at which UI device 4 detect the inputs of the user.

Prediction module 14 determines a distance between the alignment point of first input and the second input. That is, in the example of FIG. 1, prediction module 14 may determine a log distance between the first input proximate to "O" key 30 and the second input proximate to "X" key 28. Prediction module 14 also determines a time elapsed between the first time at which the first input was detected and the second time at which the second input was detected at UI device 4. Using the log distance between the first and second inputs and the time duration elapsed, prediction module 14 determines at least one probability that indicates whether the input posture is a one-finger posture or a two-finger posture. In the current example, the log distance between the alignment points of the first and second inputs may be 6 pixels and the time elapsed between the first and second inputs may be 100 milliseconds. Prediction module 14 may determine based on the time elapsed and log distance between alignment points that the use is using a two-thumb input posture.

As further described in FIG. 2, prediction module 14 may use one or more classifiers to determine, based on the time elapsed and distance between alignment points, which input posture the user is using. For instance, prediction module 14 may use the time elapsed and the log distance between two consecutive key presses as the features to determine the input posture. To account for individual typing speed differences, prediction module 14 may also use normalized time elapsed between consecutive key presses as a feature. Normalized time elapsed may be calculated according the following equation: normalized time elapsed=time elapsed/ average time elapsed for the last n key presses, wherein n may be some integer (e.g., n=10).

Prediction module 14 may use the determination of the input posture to select one or more spatial models. Prediction module 14 uses the one or more spatial models to determine one or more probabilities that a particular key of graphical keyboard 24 has been selected by the user based on alignment points of the first and second inputs. In some examples, a spatial model includes a bivariate Gaussian model for a particular key. The bivariate Gaussian model for a key may include a distribution of coordinates (e.g., (x,y) coordinate pairs) that correspond to locations of UI device 4 that display the given key. More specifically, in some examples, a bivariate Gaussian model for a key may include a distribution of coordinates that correspond to locations of UI device 4 that are most frequently selected by a user when the user intends to select the given key. Although described as bivariate Gaussian models in the example of FIG. 1, any suitable statistical models may be used for a key.

In some examples, techniques of the disclosure may use different spatial models based on posture, key, and the user. Each different spatial model may have a different distribution of coordinates that corresponds to locations of UI device 4 that are most frequently selected for a given set of one or more posture, key, and user information. For instance, a user, when using a two-thumb input posture, may exhibit bias when selecting keys, i.e., the distribution of coordinates may be slightly shifted in one or more directions in contrast to a distribution of coordinates for a one-finger input posture. Consequently, one or more spatial models associated with different postures for a given key may include more accurate distributions of coordinates for inputs associated with the given key. As further described in FIGS. 2 and 3, the spatial models may be hierarchically adapted and selected based on the availability and/or sufficiency of posture, key, and user information. Using techniques of the disclosure, prediction module 14 may therefore determine an input posture as described above, select one or more spatial models corresponding to the determined posture, and using the spatial model predict the key the user intended to select. In the example of FIG. 1, prediction module 14 may select a spatial model associated with a two-thumb input posture and test one or more keys proximate to the second input to determine which key the user intended to select. Using the one or more spatial models, prediction module 14 may determine that the user intended to select "X" key 28 that is associated with the letter "X". Prediction module 14 may therefore select letter "X" for display at text editor control 22.

FIG. 2 is a block diagram illustrating further details of one example of a computing device shown in FIG. 1, in accordance with one or more aspects of the present disclosure. FIG. 2 illustrates only one particular example of computing device 2, and many other examples of computing device 2 may be used in other instances.

As shown in the specific example of FIG. 2, computing device 2 includes one or more processors 40, one or more input devices 42, one or more communication units 44, one or more output devices 46, one or more storage devices 48, and user interface (UI) device 4. Computing device 2, in the example of FIG. 2 includes UI module 6, keyboard module 8, gesture module 10, operating system 49, prediction module 14, spatial models 50, and language model 52. Prediction module 14 may further include single input classifier 54, time window classifier 56, selection module 58, and user module 60. Each of components 40, 42, 44, 46, and 48 may be interconnected (physically, communicatively, and/or operatively) for inter-component communications. In some examples, communication channels 51 may include a system bus, network connection, interprocess communication data structure, or any other channel for communicating data. As one example in FIG. 2, components 40, 42, 44, 46, and 48 may be coupled by one or more communication channels 51. UI module 6, keyboard module 8, gesture module 10, application modules 12, operating system 49, prediction module 14 and its respective components (e.g., single input classifier 54), spatial models 50, and language module 52 may also communicate information with one another as well as with other components in computing device 2.

Processors 40, in one example, are configured to implement functionality and/or process instructions for execution within computing device 2. For example, processors 40 may be capable of processing instructions stored in storage device 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 2 during operation. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 2 (e.g., applications 48) to temporarily store information during program execution.

Storage devices 48, in some examples, also include one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 44. Computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G, and WiFi radios computing devices as well as Universal Serial Bus (USB). In some examples, computing device 2 utilizes communication unit 44 to wirelessly communicate with another computing device that is operably coupled to computing device 2.

Computing device 2, in one example, also includes one or more input devices 42. Input device 42, in some examples, is configured to receive input from a user through tactile, audio, or video feedback. Examples of input device 42 include a presence-sensitive display, a mouse, a keyboard, a voice responsive system, video camera, microphone or any other type of device for detecting a command from a user. In some examples, a presence-sensitive display includes a touch-sensitive screen.

One or more output devices 46 may also be included in computing device 2. Output device 46, in some examples, is configured to provide output to a user using tactile, audio, or video stimuli. Output device 46, in one example, includes a presence-sensitive display, a sound card, a video graphics adapter card, optical projector, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user.

In some examples, UI device 4 may include functionality of input device 42 and/or output device 46. In the example of FIG. 2, UI device 6 may be a presence-sensitive display. In some examples, a presence sensitive display may detect an object at and/or near the screen of the presence-sensitive display. As one example range, a presence-sensitive display may detect an object, such as a finger or stylus that is within 2 inches or less of the physical screen of the presence-sensitive display. The presence-sensitive display may determine a location (e.g., an (x,y) coordinate) of the presence-sensitive display at which the object was detected. In another example range, a presence-sensitive display may detect an object 6 inches or less from the physical screen of the presence-sensitive display and other exemplary ranges are also possible. The presence-sensitive display may determine the location of the display selected by a user's finger using capacitive, inductive, and/or optical recognition techniques. In some examples, presence sensitive display provides output to a user using tactile, audio, or video stimuli as described with respect to output device 46.

Computing device 2 may include operating system 49. Operating system 49, in some examples, controls the operation of components of computing device 2. For example, operating system 49, in one example, facilitates the communication of UI module 6, keyboard module 8, gesture module 10, applications 12, prediction module 14, spatial models 50, and language model 52 with processors 40, communication unit 44, storage device 48, input device 42, output device 46, and UI device 4. One or more components of storage devices 48 including UI module 6, keyboard module 8, gesture module 10, application modules 12, operating system 49, prediction module 14, spatial modules 50, and language module 52 may each include program instructions and/or data that are executable by computing device 2. As one example, UI module 6 may include instructions that cause computing device 2 to perform one or more of the operations and actions described in the present disclosure. In some examples, one or more of the components illustrated in storage device 48 may be implemented in hardware and/or a combination of software and hardware.

As shown in FIG. 2, prediction module 14 further includes single input classifier 54, time window classifier 56, selection module 58, and user module 60. Single input classifier 54 receives information that indicate input UI device 4 from UI module 6 and gesture module. For instance, single input classifier 54 receives information that indicates locations of UI device 4 selected by a user. Single input classifier 54 may further indicate the time at which each location was selected, in some examples. In other examples, single input classifier 54 determines the time at which each location was selected upon receiving the information from one or more of gesture module 10 and/or UI module 4.

Single input classifier 54 may be implemented using one or more classifier techniques. Example techniques may include Support Vector Machines, neural networks, Bayes classifiers, etc. Using information indicating the distance between detected locations of UI device 4 selected by the user and the time elapsed between inputs to select the locations, single input classifier 54 may generate a probability of a given input posture. That is, single input classifier 54 may generate a probability that the input posture is a two-thumb input posture. Single input classifier 54 may also generate a probability that the input posture is a single-finger input posture. In other examples, single input classifier 54 may generate probabilities for any number of input postures.

To generate a probability of a posture, single input classifier 54 determines the Euclidean distance 26 between a coordinate (x1, y1) received at time T1 and coordinate (x2, y2) received a time T2. Single input classifier 54 also determines the time elapsed between time T1 and time T2. Using the distance and elapsed time, single input classifier 54 generates one or more probabilities of input postures.

In some examples, prediction module 14 also includes time window classifier 56. Time window classifier 56 may also implement one or more classifier techniques as described above with respect to single input classifier 54. Time window classifier 54 may classify each input and assumes the user does not change posture rapidly. In such examples, time window classifier 56 determines a sliding time window of 10 inputs (e.g., 10 key taps which may approximate about 2 words) to generate a probabilities that the user is providing inputs for given input posture. Time window classifier 56, in some examples, receives a probability score and indication of input from single input classifier 54 for each input (e.g., each tap or a portion of continuous swipe gesture) determined by single input classifier 54. Time window classifier 56, as further described below, may generate a probability that inputs are entered using a given input postures based on a group of one or more probabilities that are determined over time and received from single input classifier 54.

In one example, for each time window, time window classifier 56 may determine a probability of an input posture using features including: (1) a correlation between time elapsed and log distance between two inputs (2) average probability for each input to be one-finger input posture (3) average number of inputs classified as using one-finger input posture and (4) average number of inputs classified as using two-thumb input posture. Time window classifier 56 may also give probability scores for each posture.

As shown in FIG. 2, prediction module 14 includes a selection module 58. Selection module 58 may receive information from time window classifier 56 and/or user module 60. Information from time window classifier 56 may indicate a probability for a given input posture over a time window. User module 60 may indicate a probability that a given user is providing input. Based on information received from selection module time window classifier 56 and user module 60, selection module 58 may select a spatial model from spatial models 50. As further described in FIG. 3, spatial models 50 may be a hierarchical adaptive spatial model consisting of submodels that are selectable by selection module 58 based on key, user, and posture information.

As one example, selection module 58 may receive from time window classifier 56 a probability that single input classifier 54 is providing inputs using a two-thumb input posture. Selection module 58 may further receive from user module 60 a probability that particular user is providing inputs. Based on this information, selection module 58 may select one of spatial models 50 and determine the probability that the input corresponds to a given key of graphical keyboard 24 that is associated with the spatial model. Selection module 58 may determine for multiple different spatial models that each associated with a different key, which key has the highest probability of being selected by the input of the user. In response to determining the key associated with the highest probability, selection module 56 may send the character associated with the key to UI module 6. UI module 6 may in turn cause UI device 4 to output the character for display.

Computing device 2, in some examples, includes language model 52. Language model 52 may include a lexicon. In some examples, a lexicon may include a listing of words and may include additional information about the listed words. A lexicon may be represented by a range of data structures, such as an array, a list, and/or a tree. For example, language model 52 may include a lexicon stored in a trie data structure. A lexicon trie data structure may contain a plurality of nodes, each node may represent a letter. The first node in a lexicon trie may be called the entry node which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag which indicates that the node is a terminal node. Each terminal node of a lexicon trie may indicate a complete word (e.g., a candidate word). The letters indicated by the nodes along a path of nodes from the entry node to a terminal node may spell out a word indicated by the terminal node. In some examples, language model 52 may be a default dictionary installed on computing device 2. In other examples, language model 52 may include multiple sources of lexicons, which may be stored at computing device 2 or stored at one or more remote computing devices and are accessible to computing device 2 via one or more communication channels.

In some examples, language model 52 may be implemented in the firmware of computing device 2. Language model 52 may include language model frequency information such as n-gram language models. An n-gram language model may provide a probability distribution for an item $x_i$ (letter or word) in a contiguous sequence of items based on the previous items in the sequence (i.e., $P(x_i|x_{i-(n-1)}, \ldots, x_{i-1})$). For instance, a bigram language model (an n-gram model where n=2), may provide a probability that the letter "X" follows the sequence "FOX". In some examples, language model 52 includes a lexicon trie with integrated language model frequency information. For instance, each node of the lexicon trie may include a representation of a letter and a probability value.

Selection module 58, in some examples, may further use language module 52 to determine the probability of that a given key was selected by user. For instance, when determining the probability of a key being selected by a user, selection module 58 may determine whether the character of the key corresponds to a word in language model 52 or a phrased generated based on words included in language model 52 and a context of previously or successively entered characters. For instance, selection module 58 may determine that, given the letters "FO" already typed and an input proximate to "X" and Z" at graphical keyboard 24, "FOX" and is more probable than "FOZ" and therefore assigns a higher probability to the key associated with "X" and than the key associated with "Z."

In some examples, prediction module 14 may incrementally determine one or more characters, words, phrases that are indicated by tap and/or continuous gesture. In one example, a user may desire to enter text, for example the word "friend" into a text entry area of the GUI. The user, in accordance with the techniques of this disclosure may perform a series of tap gestures at a graphical keyboard that is output for display by computing device 2. The gesture may include a plurality of distinct taps. In some examples, the tap gestures may be divided into portions with substantially equivalent time durations, while in other examples the tap gestures may be of different durations.

Keyboard module 8 may receive data from gesture module 10 that represents the sequence of touch events generated by gesture module 10. Keyboard module 8 may also receive data from gesture module 10 that represents locations of the presence-sensitive screen of UID 4 where UID 4 presents each of the keys of the graphical keyboard. Keyboard module 8 may communicate with prediction module 14 to determine, based on the locations of the keys, that the sequence of touch events represents a selection of one or more keys. Keyboard module 8 may determine one or more character strings based on the selection where each character in the character string corresponds a key of the graphical keyboard, in accordance with techniques of this disclosure. Keyboard module 8 may send data indicating one or more character strings to UI module 6.

To determine the sequence of touch events represents a selection of one or more keys, keyboard module 8 may use one or more spatial models 50. In general, spatial models 50 may indicate one or more probabilities that a particular key of a graphical keyboard has been selected based on location data associated with a user input. In some examples, spatial models 50 include a bivariate Gaussian model for each key. The bivariate Gaussian model for a key may include a distribution of coordinates (e.g., (x,y) coordinate pairs) that correspond to locations of UID 4 that present the given key. More specifically, in some examples, a bivariate Gaussian model for a key may include a distribution of coordinates that correspond to locations of UID 4 that are most frequently selected by a user when the user intends to select the given key. The shorter the distance between location data of a user input and a higher density area of one of spatial models 50, the higher the probability that the key associated with spatial model 50 has been selected. A greater distance between location data of a user input and a higher density area of one of spatial models 50, the lower the probability that the key associated with the one of spatial models 50 has been selected.

Keyboard module 8 may use spatial models 50 to compare the location components (e.g., coordinates) of one or more touch events in the sequence of touch events to respective locations of one or more keys of a graphical keyboard and generate a probability based on these comparisons that a selection of a key occurred. In some examples, keyboard module 8 may generate a spatial model score (or "spatial model probability") using one or more of spatial models 50. The spatial model score may indicate a probability of a selected key based at least in part on locations of UID 4 traversed by a gesture. In some examples, a spatial model score may indicate a combined probability of a group of selected keys based at least in part on locations of UID 4 traversed by a gesture.

Keyboard module 8 may use one or more of spatial models 50 to compare the location component of one or more touch event in the sequence of touch events to a key location of a particular key of a graphical keyboard. Keyboard module 8 may receive data indicating one or more of spatial models 50 from prediction module 14 that are determined by prediction module 14 using techniques of this disclosure based on determined posture and/or hierarchical organization of spatial models 50. The location component of each touch event in the sequence may include one location of UID 4. A key location (e.g., a centroid of a key) of a key in a graphical keyboard may include a different location of UID 4. Keyboard module 8 may use one or more of spatial models 50 to determine a Euclidian distance between the two locations and generate a probability based on the Euclidian distance that the key was selected. Spatial models 50 may indicate a higher probability for a key that shares a smaller Euclidian distance with one or more touch events than a key that shares a greater Euclidian distance with one or more touch events. Based on the spatial model probability associated with each key, keyboard module 8 may assemble the individual key selections with the highest spatial model probabilities into a time-ordered sequence of keys that keyboard module 8 may then determine represents a character string. The combined probabilities of each key may represent a spatial model score for the character string.

Keyboard module 8 may use a language model 52 to determine language model scores (or "language model probabilities") for one or more characters strings based on the sequence of keys corresponding to touch events. For example, each key of the keyboard may represent a character or a keyboard operation. Keyboard module 8 may determine, based on the sequence of keys, particular characters represented by one or more key selections. A character such as a number or a lowercase letter may require a single character key selection (e.g., <letter-key>, <number-key>, etc.) and a character such as a capitalized letter may require two key selections (e.g., <shift-key>+<letter-key>, etc.).

Keyboard module 8 may access language model 52 of computing device 2 to determine language model scores for a group of one or more character strings based on sequences of keys corresponding to a gesture. That is, keyboard module 8 may incrementally generate a group of one or more character strings using language model 52 in response to receiving indications of one or more gestures. A character string may be a group of characters comprising a prefix or portion of a character string included in language model 52 or an out-of-vocabulary (OOV) character string not included in language module 52. In some examples, a character string may be a group of characters comprising a complete character string included in language model 52 or a complete OOV character string. As the user provides user input corresponding to one or more gestures, keyboard module 8 may incrementally determine spatial and language model scores corresponding to character strings. Using the spatial and language model scores, keyboard module 8 may determine a combined score for each character string based on the spatial and language model score for each respective character string. Keyboard module 8 may update the spatial, language, and/or combined scores incrementally as keyboard module 8 determines subsequent indications of gestures. For instance, keyboard module 8 may, while receiving a plurality of indications of one or more gestures detected at a presence-sensitive screen, update a language model score based on a language context, wherein the language context changes in response to at least one the plurality of indications of one or more gestures. For instance, the language model scores associated with character strings in language model 52 may change in response to character strings that are inputted. Because the combined score may indicate a probability that a character string corresponds to a gesture, keyboard module 8 may rank the character strings by their respective combined scores as further described in this disclosure. Keyboard module 8 may then output the character strings and/or determine other character strings based on the character strings for output.

Generally, language model 52 of computing device 2 may include a list of character strings, e.g., words, within a written language vocabulary. In some examples, language model 52 may be based on and/or include a set of character strings based on a dictionary (e.g., that includes a vocabulary of words) stored at computing device 2 or a remote computing device that is accessible by computing device 2. In some examples, the dictionary may include a vocabulary of words. A vocabulary of words may be a body of words used in a written and/or spoken language. A dictionary may be implemented as a data structure that stores one or more words of a vocabulary in a structured manner. Language model 52 may indicate a probability of each respective character string based on the frequency with which the character string occurs in a given language context. For instance, the character string "door" may be more frequently used in the English language following the character string "the" and therefore associated with a larger probability than, for example, the character string "run" following the character string "the."

In some examples, keyboard module 8 may use language model 53 to determine a language model score for a character string based on a language context that may include, but is not limited to, e.g., a character corresponding to indication of the gesture performed by the user, character strings in a dictionary and/or previously inputted character strings, etc. For example, keyboard module 22 may determine a group of characters associated with keys corresponding to a gesture. The group of characters may be a prefix or portion of a character string. The character string may be included in language model 52 or may be an out-of-vocabulary character string. Keyboard module 8 may search or "look ahead" to determine one or more character strings in language model 52 that correspond respectively to the prefix.

In some examples, keyboard module 8 may perform a lookup of multiple different groups of characters associated with keys corresponding to a gesture, for example, where each group of characters may be a prefix or portion of a character string. Keyboard module 8 may use language model 52 to identify one or more character strings in language model 52 that include a part of or all of the characters of the group of characters that may be a prefix or portion of the character string. For instance, a user may perform a gesture at UID 4 that traverses the keys s-a-r-t. Keyboard module 8 may therefore perform a lookup of prefix s-a-r to determine a group of character strings that begin with s-a-r. Similarly, keyboard module 8 may perform a lookup of prefix s-a-t to determine a group of character strings that begin with s-a-t.

As described above, keyboard module 8 may determine a combined score for each character string based at least in part on the respective spatial and language module scores for each respective character string. The combined probability for a character string may therefore represent the probability of the character string based on a language context and the accuracy of a gesture given a set of keys. Keyboard module 8 may order each character string in a group of character strings by combined score in descending order from most probable character string to least probable character string. In some examples, keyboard module 8 may determine one or more character strings based on the one or more character string with the highest probabilities. UID 4 may output such character strings as suggested character strings.

Figure 3:
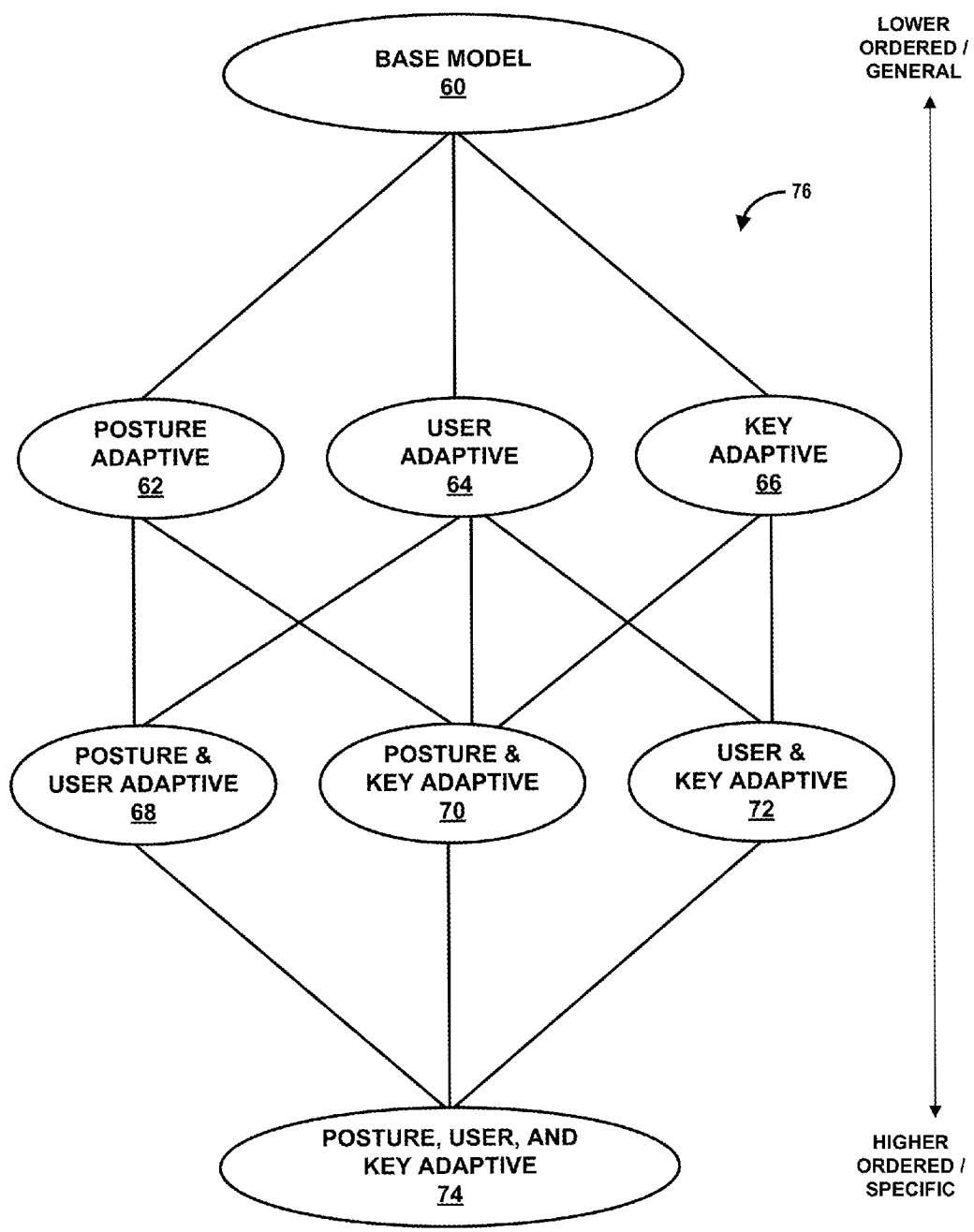
FIG. 3 is a block diagram illustrating a conceptual diagram of a hierarchical adaptive spatial model, in accordance with one or more techniques of the present disclosure.

FIG. 3 is a block diagram illustrating a conceptual diagram of a hierarchical adaptive spatial model 76 ("spatial model 76"), in accordance with one or more techniques of the present disclosure. Hierarchical adaptive spatial model 76 may include one or more submodels that are each spatial models. A spatial model generally may be a probability distribution that has its own center, mean, covariance, etc. The probability distribution may be based on but not limited to one or more of input posture, one or more previous inputs, typing position biases of one or more users, training data that includes a set of training inputs, etc. As shown in FIG. 3, spatial models 50 of FIG. 2 may be illustrated hierarchically as hierarchical spatial model 76. In some examples, hierarchical spatial model 76 may be implemented as one or more hash tables. The hierarchical models may take into account different conditions for specialized adaptation and provide a back-off mechanism when there is not enough data or confidence for the higher order models.

The zeroth or lowest order sub-model of spatial model 76 is base model 60. Base model 60 may be key, person, and posture independent. Higher order models consist of a combination of spatial models that adapt to hand posture (e.g. one finger, two thumbs, or ten fingers on tablets), key or bi-letters (e.g. "h/t" where the current target letter is the "h" key and the previous letter is "t"), the individual user, or a combination thereof. For instance, posture adaptive sub-model 62 may consist of a spatial model that accounts for bias in the location of user inputs based on posture. Posture and key adaptive sub-model 68 may consist of a spatial model that accounts for bias in the location of user inputs based on posture and past user inputs specific to the user that have been learned by computing device 2. As another example, posture, user, and key adaptive sub-model 74 may provide sub-model that includes a distribution of UI device coordinates based on posture, user, and key sub-models. A key spatial model can also be more specialized to include bi-letter patterns that occur frequently, for instances, "h" followed by "e," "t" followed by "h" etc. Since these may be highly frequent patterns, a small improvement in detecting these keys based on these more specialized models may provide an improvement in the overall key detection accuracy.

In the example of FIG. 3, base model 60 predicts a key that has the shortest Euclidean distance from the tapping coordinates. That is, prediction module 14 may, upon receiving an (x,y) coordinate corresponding to a location touched by the user at UI device 4, determine the Euclidean distance between the coordinate and, for example, the centroid or center of mass of the distribution of coordinates in the base model for one or more given keys. Prediction module 14 may associate a highest probability with a key that has the shortest Euclidean distance to the received (x,y) coordinate.

Posture-adaptive sub-model 62 accounts for differences in input locations at UI device 4 that correspond to detected user input based on input posture. That is, as previously described, one or more spatial models may include different distributions of input locations that vary based which input posture the user is using to provide input. User adaptive sub-model 64 may account for differences in input locations at UI device 4 that correspond to detected user input based on individual user biases. That is, one user may consistently tap keys at the bottom edge of the key while other users may consistently tap upper-right corner keys (e.g., "I", "K", "L", "O", "P" keys of a QWERTY keyboard) in the center while tapping bottom left hand corner keys (e.g., "A", "S", "D", "Z", "X" keys of a QWERTY keyboard) at the top edge of the keys. Prediction module 14 may learn such biases over time and generate spatial models that account for the biases. In some examples, prediction module 14 determines that inputs received by computing device 10 consistently exhibit biases associated with learned spatial models for a given user. Based on the determination, prediction module 14 can use a user adaptive spatial model to more accurately predict the keys selected by the user. Key adaptive sub-model 66 may be a spatial model that consists of a bivariate Gaussian model for each key based on observations of user input from many different users. Then the key detection process involves choosing the key whose Gaussian model gives the highest probability for the given (x, y) tapping coordinates. When this is combined with posture and individual adaptation, more specialized Gaussian models may be built for each key.

In accordance with techniques of the disclosure, prediction module 14 will use one or more combinations of sub-models when a sufficient number of samples have been determined by prediction module 14 to build a reliable model. That is, prediction module 14 may include one or more thresholds for one or more combinations of sub-models. Each such sub-model or combination of sub-models would only become active when its reliability passes a set threshold (e.g. 100+ inputs/observations had been collected); otherwise, the sub-models are still "growing" but in "dormant" mode, i.e., not used by prediction module 14. In this way, prediction module 14 uses such thresholds or "backoffs" to select those sub-models of spatial model 56 that have sufficient information to provide predictions with improved accuracy. Consequently, prediction module 14 may select a more accurate spatial model, e.g., sub-model 74, that is based on posture, key, and user adaptive information when such information is available and/or a sufficient quantity of such information is available. If a sufficient quantity of posture, key, and user adaptive information is not available based on a given threshold, prediction module 14 can adaptively fall back to lower ordered sub-models.

When prediction module 14 determines which key has been selected, a higher order more specialized model is used if it meets a set of conditions such as a particular posture mode is detected with high confidence and the corresponding model (e.g. h/t, one-finger) is available (live, matured). Otherwise, prediction module 14 backs off to a lower order model. Prediction module 14 may back off to a base model which is key, individual and posture independent if necessary. Prediction module 14 may compare key detection accuracy with different models to analyze their relative effectiveness. This can inform prediction module 14 of the order of the back-off models to use when there is not enough data for higher order models.

In some examples, key adaptive model 66 can be trained offline by collecting data from a large number of users, and can therefore be used as a basic backup model once enough data is collected. User and key adaptive model 72 may provide higher accuracy than the posture and key adaptive model 70 in some examples. Consequently, user and key adaptive model 72 can have higher priority in some examples. That is, prediction module 14 may use user and key adaptive model 72 more frequently or in response to a lower threshold than other submodels. Therefore, in some examples, when computing device 2 does not have enough data for the user, computing device 2 can use posture and key adaptation model 70 instead of user and key adaptive model 72.

In some examples, hierarchical adaptive spatial model 76 may be implemented as a hash table or a group of hash tables. In the example of a group of hash tables, prediction module 14 may maintain a hash table for each of submodels 60-74. As one example, prediction module 14 may maintain a posture, user, and key adaptive hash table ("PUK table") for posture, user, and key adaptive spatial model 74. Each bucket of the PUK table may include a pointer to a Gaussian model for a key of a graphical keyboard. Prediction model 10 may generate a search key, such as a hash key from a group of data that includes: a determined posture P, a determined user U, and a determined key K. In other words, prediction model 10 generates the hash key to select a Gaussian model from the PUK table based on a tuple of (P, U, K). P may be data that represents an input posture (e.g., an input posture type), U may be data that includes an identifier of a user of computing device 2, and K may be data that includes an identifier of a key of a graphical keyboard. In some examples, prediction module 14 may determine probabilities that the user selected a given key of the graphical keyboard by testing a number of different neighboring keys to a touch location detected at UI device 4. For instance, prediction module 14 may test key "X" as shown in FIG. 1, but may also test neighboring keys "C", "Z", "D", which may be within a threshold distance of the touch location of a tap gesture performed at the "X" key. Prediction module 14 may search, based at least in part on the search key, hierarchical adaptive spatial model 76 to select at least one spatial model (which may be a submodel of hierarchical adaptive spatial model 76) of the hierarchical spatial model. Therefore, prediction module 14 may select different Gaussian models from hierarchical adaptive spatial model 76 by generating hash keys for each of the keys and determining the respective spatial model probabilities for the given keys. For instance, prediction module 14 may determine spatial model probabilities for the respective keys using the following inputs: (P, U, K="X"), (P, U, K="C"), (P, U, K="Z"), (P, U, K="D"). Prediction module 14 determines the spatial model probability that the "X" key was tapped by selecting a Gaussian model from the PUK table based on a hash key generated from the values included in (P, U, K="X"). That is, the hash key generated based on the values included in (P, U, K="X") may correspond to a bucket in the PUK table that includes a pointer to a Gaussian model for the "X" key, wherein the probability distribution of the Gaussian model is based on the values (P, U, K). Prediction module 14 may perform the same operations for (P, U, K="C"), (P, U, K="Z"), (P, U, K="D").

In some examples, prediction module 14 may not have a sufficient amount of information to generate a determined posture P, a determined user U, and/or a determined key K. As one example, the quantity of information may be less than a threshold that must be satisfied in order to a determined posture P. Prediction module 14 may maintain similar thresholds for requiring a sufficient amount of information to generate a determined user U and/or a determined key K. In such examples where there is an insufficient amount of information, prediction module 14 may generate a hash key based on inputs for which there is a sufficient amount of information. For instance, if prediction module 14 has an insufficient amount of information to generate a determined posture P, prediction module 14 may generate a hash key based on (U, K) rather than (P, U, K) because insufficient information exists for P. The hash key for (U, K) may correspond to a bucket in the PUK table that includes a pointer to a bucket in a different user and key adaptive hash table ("UK table") for user and key adaptive spatial model 72. The bucket in the UK table referenced by the pointer in the PUK table may include a pointer to a Gaussian model for the "X" key, wherein the probability distribution of the Gaussian model is based on the values (U, K). In this way if insufficient information exists for P (e.g., does not satisfy a threshold, such as being less than a threshold) and therefore the confidence level for selecting a spatial model based on posture is too low, prediction module 14 can traverse through the hash tables that implement hierarchical adaptive spatial model 76 to select a Gaussian model based on information for which sufficient information exists (e.g., satisfies a threshold, such as being greater than a threshold). Thus, upon determining a probability that indicates the input posture is one of a plurality of input posture types, prediction module 14 may determine, responsive to determining that the probability satisfies a threshold and based at least in part on the input posture, the spatial model.

Prediction module 14 may similarly maintain hash tables for each of submodels 60-74. In this way, prediction module 14 may generate hash keys based on values taking the form [(posture, user, key), key] and select corresponding spatial models accordingly as described above. As another example, prediction module 14 may not have a sufficient amount of information to generate any of a determined posture P, a determined user U, and a determined key K. Prediction module 14 may therefore generate a hash key based on (<empty>). Prediction module 14 may determine a bucket in the PUK table that corresponds to (<empty>). The bucket may include a pointer to base model 60, in which case, prediction module 14 determines a spatial model probability that "X" was selected using the base model 60. In another example, prediction module 14 may generate a hash key based on (P) where a sufficient amount (e.g satisfies a threshold) of P posture information is available. The hash key corresponding to the bucket in the PUK table may include a pointer to a bucket in a posture and key hash table ("PK table") for posture and key adaptive model 70. The bucket in the PK table referenced by the pointer may include a different pointer to a bucket in a power table ("P table") for posture adaptive model 62. The pointer to the bucket in the P table may reference a bucket in the P table that includes a Gaussian model for the "X" key based on the P posture information. Prediction module 14 may then determine the spatial model probability that the "X" key was selected by the user. In this way, if insufficient amounts of information exist for posture, user, and/or key, prediction module 14 may traverse to lower ordered models in a hierarchical fashion as described in the example of FIG. 3. Although the techniques of FIG. 3 have been described with respect to a group of hash tables, the techniques may be implemented using a single hash table, any other single suitable data structure, or any other combination of one or more different suitable data structures.

In some examples, prediction module 14 may update one or more spatial models (including, for example, hierarchical adaptive spatial models and submodels) based on training data and/or observed user inputs. That is, prediction module 14, over time, may periodically and/or continuously update spatial models as additional information about user inputs is determined. Prediction module 14 may determine such information as the user types or from one or more sets of information (e.g., training information). In this way, as prediction module 14 determines such new information, prediction module 14 may update one or more spatial models to provide greater accuracy in determining whether a touch input corresponds to a key of a graphical keyboard. For instance, if a user consistently biases her tap input of the "K" key of the graphical keyboard to the bottom left corner of the key, prediction module 14 may update spatial models that are based on the user to reflect the bias. In other words, prediction module 14 may update the Gaussian distributions of posture and user adaptive spatial model 68 and user and key adaptive spatial model 72 to reflect the user's bias. As prediction module 14 determines more information and provides additional updates to such spatial models, prediction module 14 may more accurately select which spatial model to use from hierarchical adaptive spatial model 76, when determining whether a touch input corresponds to a key of the graphical keyboard. In other words, as prediction module 14 determines more information, prediction module 14 may determine which spatial model to use with greater confidence. Consequently, as prediction module 14 determines more information, prediction module 14 may select higher-ordered spatial models of hierarchical adaptive spatial model 76. In some examples, as the probabilities of prediction module 14's classifications of input posture, user providing the input, etc. increase, prediction module 14 may determine that such probabilities satisfy thresholds that must be satisfied in order to use higher ordered sub-models of hierarchical spatial model 76. If such classifications do not have sufficiently high probabilities that satisfy threshold (e.g., there is insufficient confidence in the classification) then prediction module 14 may back-off and select lower ordered spatial models using information for which there is sufficient confidence (e.g., probability of the classification satisfies a threshold). Such thresholds are further described in FIG. 4.

Figure 4:
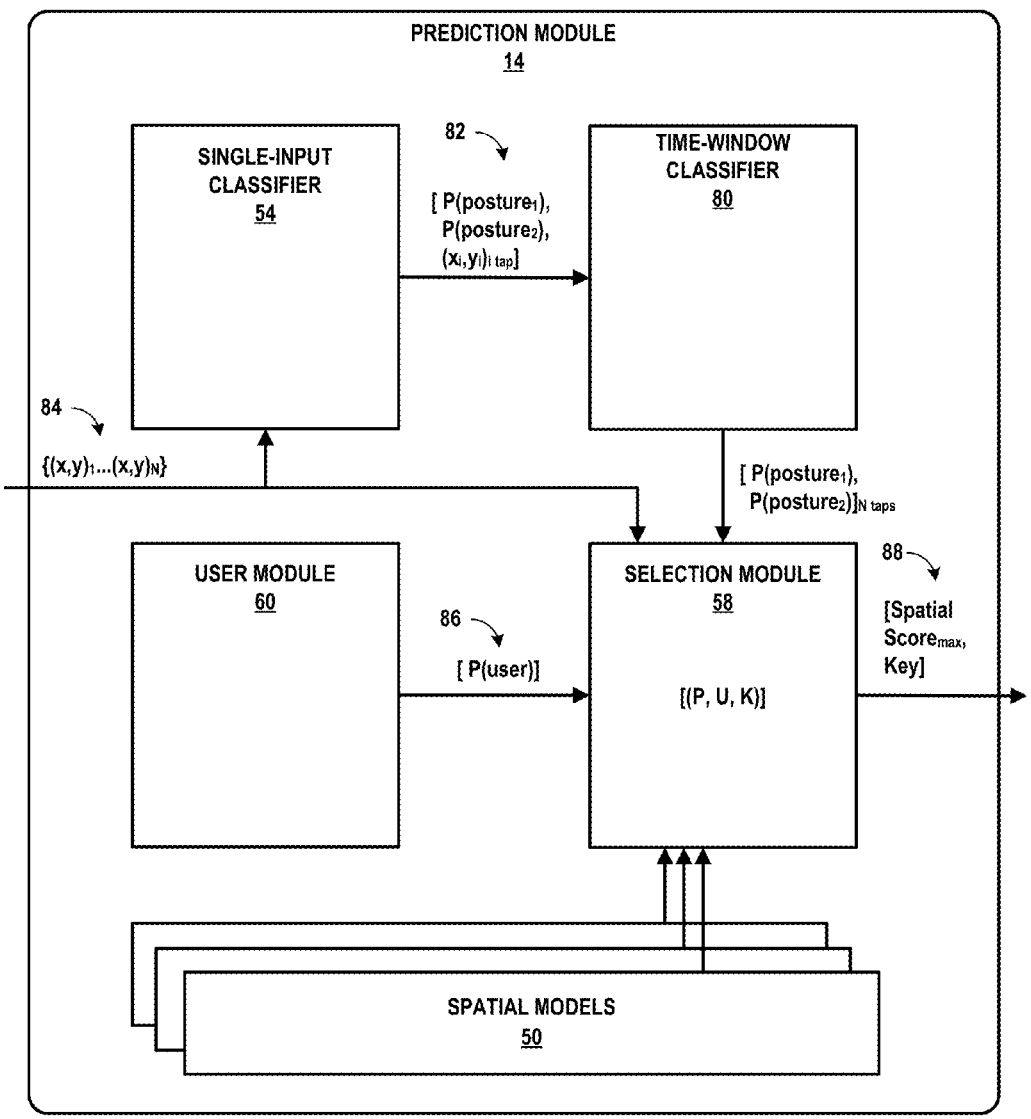
FIG. 4 is a block diagram illustrating a conceptual diagram of further details of a computing device that may implement techniques to provide improved prediction of selected keys of a keyboard based on user input posture, in accordance with one or more techniques of the present disclosure.

FIG. 4 is a block diagram illustrating a conceptual diagram of further details of a computing device that may implement techniques to provide improved prediction of selected keys of a keyboard based on user input posture, in accordance with one or more techniques of the present disclosure.

As shown in FIG. 4, prediction module 14 includes single-input classifier 54, time-window classifier 80, user module 60, selection module 58, and spatial models 50, which may be implemented in hardware, software, or a combination of hardware and software. FIG. 4 illustrates example flows of information within prediction module 14. In particular, prediction module 14 illustrates the inflow of touch events into prediction module and the outflow of a spatial model score for a key. In some examples, keyboard module 8 receives the spatial model score from prediction module 14. Keyboard module 8 may then determine a combined score for a character or group of characters based on the spatial model score and a language model score as described in FIG. 2.

Single-input classifier 54 may be a Support Vector Machine classifier (SVM classifier) that receives touch events 84 from one or more of UI module 6, keyboard module 8, and/or gesture module 10. Each touch event may correspond to a location of UI device 4 at which a gesture input is detected by UI device 4, such as a tap gesture or a portion of a continuous gesture. A touch event may include an (x, y) coordinate of UI device 4 that the gesture input was detected, a time that the gesture input was detected, etc. Upon receiving a current touch event, single-input classifier 54 may compare the current touch event to a previous touch event. That is, single-input classifier 54 may maintain data that represents information from a previous touch event. In some examples, the previous touch event may be a touch event that was received immediately prior to the current touch event. Single-input classifier 54 may calculate the time elapsed between the previous touch event and the current touch event. Single-input classifier 54 may also determine the Euclidean distance between the location of the previous touch event and the location of the current touch event.

Single-input classifier 54 may determine a probability of an input posture based at least in part on the distance between the location of the previous touch event and the location of the current touch event and the time between the location of the previous touch event and the location of the current touch event. For instance, single-input classifier 45 may generate higher probabilities indicating the input posture is bimodal when the distance between the current and previous touch events is larger and the time between the current and previous touch events is smaller. Similarly, single-input classifier 45 may generate higher probabilities indicating the input posture is single tap when the distance between the current and previous touch events is larger and the time between the current and previous touch events is larger. In some examples, the probabilities may be based on training data applied to single-input classifier 54 based on user typing behavior. As shown in FIG. 4, single-input classifier 54 may send data indicating a probability that the input posture is of a posture type (e.g., bimodal, single-tap, etc) to time-window classifier 80. In some examples, the data may indicate the probability and the corresponding posture type. Single-input classifier may send multiple probabilities and corresponding posture types to time-window classifier 80 in some examples. In some examples, single-input classifier 54 only determines the probability of one or more input postures when the distance between the location of the current touch event and the location of the previous touch event is greater than a threshold distance. In such examples, when the distance between the locations of the current touch event and previous touch event are less than the threshold distance, single-input classifier may provide a probability of 0 for each of the different input postures types.

Time-window classifier 80 receives, for a single touch input represented by a touch event, one or more probabilities of one or more different input posture type. Time-window classifier 80 may determine for a group of touch inputs represented by touch events, one or more probabilities of one or more different input posture type. That is, in one example, time-window classifier 80 provides the probability of a input posture type based on multiple gesture inputs (e.g., 10 key taps or about 2 words, in some examples). Time-window classifier 80 may be an SVM classifier that receives data 82 indicating probability information that a single gesture input is of a given posture type along with the touch event information.

In some implementations of prediction module 14, it may be assumed that the user's input posture does not change often. For example, the user may not change input posture while typing in the middle of a word or sentence. Therefore, time-window classifier 80 may determine a probability of an input posture based on multiple different features that take one or more previous user inputs into account. Prediction module 14 may generate based on a plurality of previous determinations of input posture, a statistic for at least one feature corresponding to the input posture; and responsive to receiving an input detected at the presence-sensitive input device, determine, based at least in part on the statistic, the input posture. A statistic may be a numerical representation of data corresponding to previous user inputs for a feature, such as an average, count, correlation, or any other suitable statistic.

As one example feature, time-window classifier 80 may generate a probability of an input posture based on a correlation between the time elapsed and distance (e.g., log distance) of temporally adjacent touch events. For instance, time-window classifier 80 may that higher correlation between time elapsed and distance over a group of key taps indicates single-tap input posture while lower correlation between time elapsed and distance over a group of key taps indicates bimodal (e.g., two thumb) input posture.

Time-window classifier 80 may also use as a feature the average probability score that each user input is one-finger. Time-window classifier 80 may also use as a feature the average probability score that each user input is two-finger (e.g., bimodal or two-thumb). Time-window classifier 80 may receive from single-input classifier 54, a probability that a user input is one-finger and may generate and update an average probability score that each user input is one-finger accordingly. Similarly, time-window classifier 80 may receive from single-input classifier 54, a probability that a user input is two-thumb and may generate and update an average probability score that each user input is two-thumb accordingly. In other words, the respective average probabilities may be averages of current and previous probabilities received from single-input classifier 54.

Time-window classifier 80 may also use as a feature the average number (e.g., quantity) of taps that are classified as one-finger. For a given tap input, time window classifier 80 may classify the tap input as being of the input posture type with the highest probability. That is, if single-input classifier 54 assigns an 80% probability that a tap input was input using a single-input posture and a 20% probability that a tap input was input using a two-thumb input posture, then single-input classifier 54 may classify the tap input as using single-input posture. Time-window classifier 80 may also use as a feature the average number (e.g., quantity) of taps that are classified as two-finger (e.g., bimodal or two-thumb). Time-window classifier 80 may receive from single-input classifier 54, data that indicates a user input is one-finger and may generate and update an average quantity that each user input is one-finger accordingly. Similarly, time-window classifier 80 may receive from single-input classifier 54, data that indicates a user input is two-thumb and may generate and update an average quantity that each user input is two-thumb accordingly. In other words, the respective average quantities may be averages of current and previous classifications of tap inputs received from single-input classifier 54.

Time-window classifier 80 may generate one or more probabilities that indicate one or more input postures based on a combination of one or more of the features described above. Other features not described above may also by time-window classifier 80 to generate the one or more probabilities. In one example, time-window classifier 80 may generate a higher probability that the input posture is single-tap for stronger correlations between time elapsed and log distances of key presses, higher average probability scores for each tap input to be one-finger input, and higher average number of tap inputs classified as one-finger input. Similarly, time-window classifier 80 may generate a higher probability that the input posture is two-thumb for weaker correlations between time elapsed and log distances of key presses, higher average probability scores for each tap input to be two-thumb input, and higher average number of tap inputs classified as two-thumb input. By using one or more features as described above, time-window classifier 80, which may be implemented as an SVM classifier, may generate one or more probabilities indicating one or more input postures. For instance, time-window classifier 80 may determine, for the previous 10 tap inputs, an 80% probability that the input posture is single-tap and a 20% probability that the input posture is two-thumb. Selection module 58 may receive such probabilities from time-window classifier 80, which selection module 58 may use to select spatial models and determine probabilities that different keys were selected by a user in response to a tap input.

As shown in FIG. 4, prediction module 14 includes user module 60. User module 60 may determine which user among one or more users is providing input at computing device 2. That is, user module 60 may send a data indicating a user to selection module 58, which may in turn use the data indicating the user to select one or more spatial models that are based on typing biases of the user. In some examples, user module 60 may generate a probability that a given user is providing input at computing device 2, which may be received by selection module 58. In one example, user module 60 may generate multiple probabilities corresponding to different users. User module 60 may maintain a group of one or more profiles that correspond respectively to one or more users. A profile may include data uniquely identifies a user. As one example, the operating system of computing device 2 may support one or more user accounts that are each identified by a user name. The user name for a user may be included in the profile. When a particular user is logged into the operating system of computing device 2, user module 60 may send data identifying the logged in user to selection module 58. Although described with respect to a user name of an operating system, any suitable identifier of a user from any one or more applications executing on computing device 2 may be used by user module 60. In other examples, user module 60 may include functionality of an SVM classifier that determines which user is presently typing based on a plurality of features. The features may include, typing speed, typing biases, or any other information usable to determine which user is presently typing. Selection module 58 may receive data from user module 60 that indicates the user providing input at computing device 2.

Selection module 58 may receive touch events 84 and determine spatial model scores for one or more keys of a graphical keyboard based on one or more of a determined input posture, determined user that is providing input to generate touch events 84, and/or data indicating a key of the graphical keyboard. Selection module 58 may select one or more of spatial models 50 based on the one or more of a determined input posture, determined user that is providing input to generate touch events 84, and/or data indicating a key of the graphical keyboard. For instance, selection module 58 may receive such information as determined posture P from time-window classifier 80, a determined user U from user module 60, and/or a determined key K. Selection module 58 may identify determined key K by computing the distance between the location of a received touch event and a location of a key of the graphical key displayed at UI device 4. If the computed distance is less than a threshold distance, selection module 58 may use determined key K to determine the spatial model score for the selected key. In this way, if multiple keys are within a threshold distance of the location indicated by a touch event, selection module 58 may determine spatial model scores for each respective key.

Selection module 58, in some examples, determines spatial model scores for one or more keys by traversing one or more hierarchical spatial models, such as hierarchical spatial model 76 as illustrated in FIG. 3. That is, selection module 58 may generate a hash key based on one or more of (P, U, K) information. Selection module 58 may then select a spatial model that corresponds to the hash key generated in accordance with one or more of the (P, U, K) information, as described in FIG. 3. Upon selecting a spatial model of spatial models 50 identified by the hash key, selection module 58 may generate a spatial model score by comparing a location of a determined key of the graphical keyboard to the spatial model. The spatial model score for the determined key of the graphical keyboard may indicate a probability that the touch input was intended to select the determined key of the graphical keyboard. Keyboard module 8 may receive the spatial model score from selection module 58 and determine a character, character string, etc., as described in FIG. 2. As shown in FIG. 4, keyboard module 8 may generate data indicating the key of the graphical keyboard and its corresponding spatial model score, for the key of the graphical keyboard that has the highest spatial model score, when determining multiple spatial model scores for multiple keys of the graphical keyboard in response to a touch event.

In some examples, selection module 58 may only use some of information such as determined posture P from time-window classifier 80, a determined user U from user module 60, and/or a determined key K. For instance, selection module 58 may only use determined posture P to select a spatial model if the probability associated with posture P satisfies a threshold (e.g., greater than x % probability, where x is any real number between 0 and 100). In this way, selection module 58 may select a spatial model based on (U, K) information (i.e., may select user and key adaptive spatial model 72 rather than posture, user, and key adaptive spatial model 74) when the probability does not satisfy a threshold. In this way if the probability associated with an input posture does not satisfy a threshold and therefore prediction model 14 does not have sufficient confidence in the determined input posture, prediction module 14 may select a lower ordered or more general spatial model. Thus, in one example, if the probability of single-tap input received from time-window classifier 80 is 52% and the probability of two-thumb input received from time-window-classifier is 48%, prediction module 14 may select a spatial model based only on (U, K) information. Prediction module 14 may apply similar techniques to U and K information, to only use such information when the corresponding probabilities satisfy a threshold (e.g., are greater than a threshold value). Therefore, in one example, if the probability of a user from user module 60 is less than a threshold (e.g., does not satisfy the threshold), selection module 58 may select posture and key adaptive spatial model 70 from spatial models 50 based on (P, K) information without U information. In some examples, prediction module 70 may modify one or more of the thresholds relating to P, K, and U information before, during, or after processing of one or more inputs.

Figure 5:
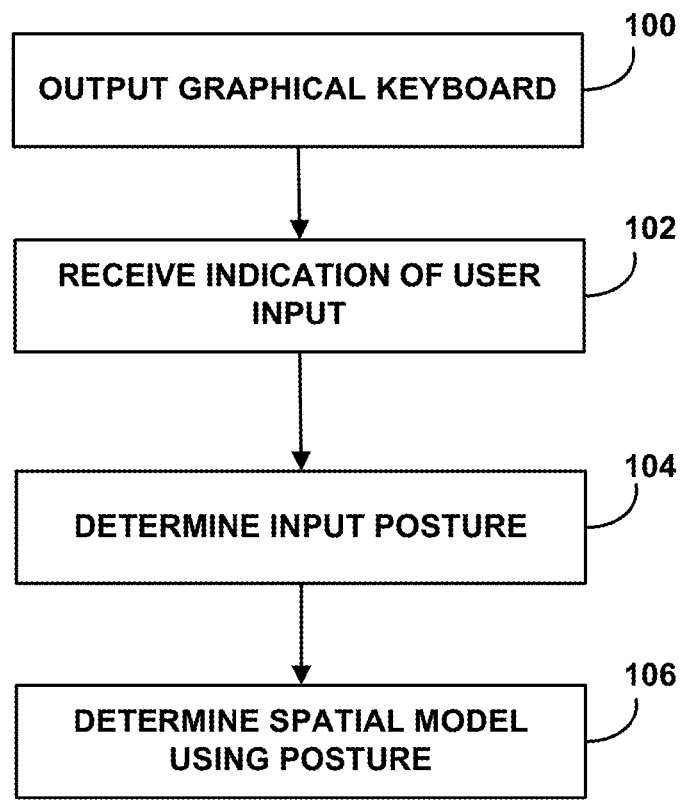
FIG. 5 is a flow diagram illustrating example operations of a computing device to provide improved prediction of selected keys of a keyboard based on user input posture, in accordance with one or more techniques of the present disclosure.

FIG. 5 is a flow diagram illustrating example operations of a computing device to provide improved prediction of selected keys of a keyboard based on user input posture, in accordance with one or more techniques of the present disclosure. For purposes of illustration only, the example operations are described below within the context of computing device 2, as shown in FIGS. 1 and 2.

In the example of FIG. 5, keyboard module outputs, for display at UI device 4, graphical keyboard 24 (100). Graphical keyboard 24 includes a plurality of keys such as "O" key 30 and "X" key 28. A user may perform two tap gestures at a region of UI device 4 that displays graphical keyboard 24. In response to the gestures, prediction module 14 may receive data corresponding to an indication of an input that is proximate to one or more of the plurality of keys (102). For instance, prediction module may receive data that indicates alignment points corresponding to locations of UI device 4 that detect the two taps. In response to receiving the indication, prediction module 14 may determine an input posture of the input, e.g., two taps. As described in FIGS. 1-5, prediction module 14 may determine a time elapsed and distance between the two tap locations represented by alignment points. Prediction module 14 generates a probability, based on the time elapsed and distance, that indicates a given input posture was used to enter the two inputs (104). Based on a determined probability of an input posture, prediction module 14 selects one or more spatial models using a hierarchical adaptive spatial model as described in FIGS. 1-3 (106). Using the one or more spatial models, prediction module 14 may determine a most probable key that the user intended to select. Upon determining the most probable key, prediction module 14 determines a character associated with the key. In some examples, prediction module 14 outputs the character for display. In other examples, prediction module 14 uses the determined character to perform word or phrase prediction.

In some examples, the operations may include determining, by the computing device, a distance between a first location of a key of the graphical keyboard and a location of the presence-sensitive input device at which the input was detected; determining, by the computing device, a time elapsed between a first time that the first input was detected at the presence-sensitive input device and a second time that a second input was detected at the presence-sensitive display, the second time occurring before the first time; and determining, by the computing device and based at least in part the distance and the time elapsed, the input posture. In some examples, the input posture includes at least one of single-finger input posture and a bimodal input posture. In some examples, the operations may include generating, by the computing device based at least in part on the input posture, a search key; searching, by the computing device and based at least in part on the search key, a hierarchical spatial model comprising a one or more sub-models, the at least one spatial model being a sub-model of the hierarchical spatial model; and selecting, by the computing device and based at least in part on the search, the at least one spatial model. In some examples, the operations may include generating, by the computing device, the search key based at least in part on one or more of an identifier of a key of the graphical keyboard and an identifier of a user of the computing device. In some examples, the operations may include determining, by the computing device, a probability that that indicates the input posture is one of a plurality of input posture types; and wherein selecting, based at least in part on the input posture, the spatial model comprises selecting the input posture responsive to determining that the probability satisfies a threshold In some examples, the operations may include generating, by the computing device and based on a plurality of previous determinations of input posture, a statistic for at least one feature corresponding to the input posture; and responsive to receiving the input detected at the presence-sensitive input device, determining, by the computing device and based at least in part on the statistic, the input posture, wherein the at least one feature comprises at least one of: a correlation between time elapsed and log distance of previous inputs detected at the presence-sensitive input device; an average probability for the input to be a single-finger input posture based on previous inputs detected at the presence-sensitive input device; an average probability for the input to be a bimodal input posture based on previous inputs detected at the presence-sensitive input device; an average number of previous inputs classified as using single-finger input posture based on previous inputs detected at the presence-sensitive input device, and an average number of previous inputs classified as bimodal input posture based on previous inputs detected at the presence-sensitive input device. In some examples, the operations may include determining, by the computing device and based at least in part on the at least one spatial model, a spatial model score that indicates a probability a key of the plurality of keys has been selected; determining, by the computing device and based at least in part on the spatial model score, a word included in a lexicon; and outputting, by the computing device and for display, the word.

Figure 6:
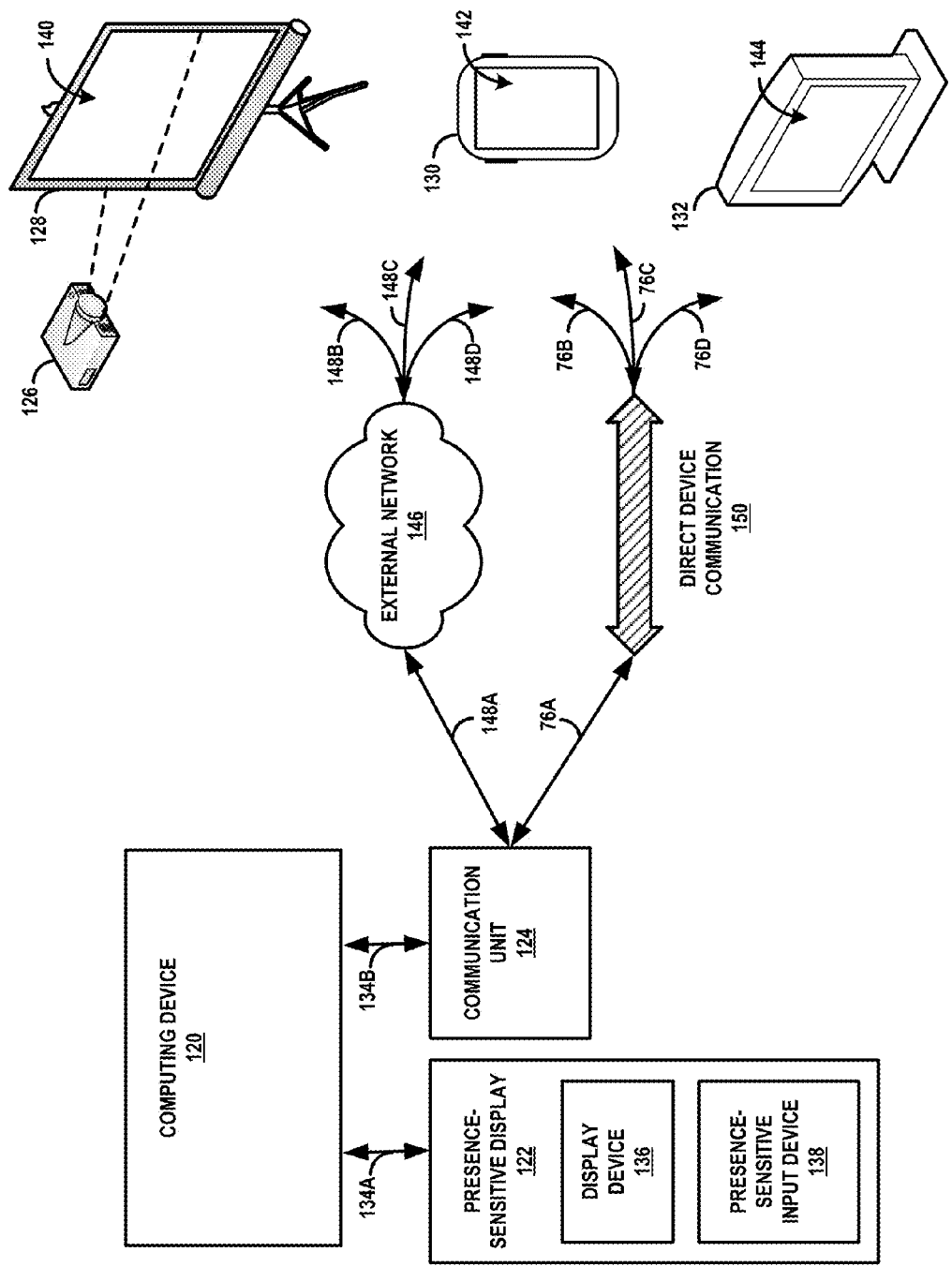
FIG. 6 is a block diagram illustrating an example computing device that outputs graphical content for display at a remote device, in accordance with one or more techniques of the present disclosure.

FIG. 6 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 6 includes a computing device 120, presence-sensitive display 122, communication unit 124, projector 126, projector screen 128, mobile device 130, and visual display device 132. Although shown for purposes of example in FIGS. 1 and 2 as a stand-alone computing device 2, a computing device such as computing device 120 may, generally, be any component or system that includes a processor or other suitable computing environment for executing software instructions and, for example, need not include a presence-sensitive display.

As shown in the example of FIG. 6, computing device 120 may be a processor that includes functionality as described with respect to processor 40 in FIG. 2. In such examples, computing device 120 may be operatively coupled to presence-sensitive display 122 by a communication channel 134A, which may be a system bus or other suitable connection. Computing device 120 may also be operatively coupled to communication unit 124, further described below, by a communication channel 134B, which may also be a system bus or other suitable connection. Although shown separately as an example in FIG. 6, computing device 120 may be operatively coupled to presence-sensitive display 122 and communication unit 124 by any number of one or more communication channels.

In other examples, such as illustrated previously by computing device 2 in FIGS. 1-2, a computing device may refer to a portable or mobile device such as mobile phones (including smart phones), laptop computers, etc. In some examples, a computing device may be a desktop computers, tablet computers, smart television platforms, cameras, personal digital assistants (PDAs), servers, mainframes, etc.

Presence-sensitive display 122, like UI device 4 as shown in FIG. 1, may include display device 136 and presence-sensitive input device 138. Display device 136 may, for example, receive data from computing device 120 and display the graphical content. In some examples, presence-sensitive input device 138 may determine one or more user inputs (e.g., continuous gestures, multi-touch gestures, single-touch gestures, etc.) at presence-sensitive display 122 using capacitive, inductive, and/or optical recognition techniques and send indications of such user input to computing device 120 using communication channel 134A. In some examples, presence-sensitive input device 138 may be physically positioned on top of display device 136 such that, when a user positions an input unit over a graphical element displayed by display device 136, the location at which presence-sensitive input device 138 corresponds to the location of display device 136 at which the graphical element is displayed. In other examples, presence-sensitive input device 138 may be positioned physically apart from display device 136, and locations of presence-sensitive input device 138 may correspond to locations of display device 136, such that input can be made at presence-sensitive input device 138 for interacting with graphical elements displayed at corresponding locations of display device 136.

As shown in FIG. 6, computing device 120 may also include and/or be operatively coupled with communication unit 124. Communication unit 124 may include functionality of communication unit 44 as described in FIG. 2. Examples of communication unit 124 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 120 may also include and/or be operatively coupled with one or more other devices, e.g., input devices, output devices, memory, storage devices, etc. that are not shown in FIG. 6 for purposes of brevity and illustration.

FIG. 6 also illustrates a projector 126 and projector screen 128. Other such examples of projection devices may include electronic whiteboards, holographic display devices, and any other suitable devices for displaying graphical content. Projector 126 and projector screen 128 may include one or more communication units that enable the respective devices to communicate with computing device 120. In some examples, the one or more communication units may enable communication between projector 126 and projector screen 128. Projector 126 may receive data from computing device 120 that includes graphical content. Projector 126, in response to receiving the data, may project the graphical content onto projector screen 128. In some examples, projector 126 may determine one or more user inputs (e.g., continuous gestures, multi-touch gestures, single-touch gestures, etc.) at projector screen using optical recognition or other suitable techniques and send indications of such user input using one or more communication units to computing device 120. In such examples, projector screen 128 may be unnecessary, and projector 126 may project graphical content on any suitable medium and detect one or more user inputs using optical recognition or other such suitable techniques.

Projector screen 128, in some examples, may include a presence-sensitive display 140. Presence-sensitive display 140 may include a subset of functionality or all of the functionality of UI device 4 as described in this disclosure. In some examples, presence-sensitive display 140 may include additional functionality. Projector screen 128 (e.g., an electronic whiteboard), may receive data from computing device 120 and display the graphical content. In some examples, presence-sensitive display 140 may determine one or more user inputs (e.g., continuous gestures, multi-touch gestures, single-touch gestures, etc.) at projector screen 128 using capacitive, inductive, and/or optical recognition techniques and send indications of such user input using one or more communication units to computing device 120.

FIG. 6 also illustrates mobile device 130 and visual display device 132. Mobile device 130 and visual display device 132 may each include computing and connectivity capabilities. Examples of mobile device 130 may include e-reader devices, convertible notebook devices, hybrid slate devices, etc. Examples of visual display device 132 may include other semi-stationary devices such as televisions, computer monitors, etc. As shown in FIG. 6, mobile device 130 may include a presence-sensitive display 142. Visual display device 132 may include a presence-sensitive display 144. Presence-sensitive displays 142, 144 may include a subset of functionality or all of the functionality of presence-sensitive display 4 as described in this disclosure. In some examples, presence-sensitive displays 142, 144 may include additional functionality. In any case, presence-sensitive display 144, for example, may receive data from computing device 120 and display the graphical content. In some examples, presence-sensitive display 144 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 120.

As described above, in some examples, computing device 120 may output graphical content for display at presence-sensitive display 122 that is coupled to computing device 120 by a system bus or other suitable communication channel. Computing device 120 may also output graphical content for display at one or more remote devices, such as projector 126, projector screen 128, mobile device 130, and visual display device 132. For instance, computing device 120 may execute one or more instructions to generate and/or modify graphical content in accordance with techniques of the present disclosure. Computing device 120 may output the data that includes the graphical content to a communication unit of computing device 120, such as communication unit 124. Communication unit 124 may send the data to one or more of the remote devices, such as projector 126, projector screen 128, mobile device 130, and/or visual display device 132. In this way, computing device 120 may output the graphical content for display at one or more of the remote devices. In some examples, one or more of the remote devices may output the graphical content at a presence-sensitive display that is included in and/or operatively coupled to the respective remote devices.

In some examples, computing device 120 may not output graphical content at presence-sensitive display 122 that is operatively coupled to computing device 120. In other examples, computing device 120 may output graphical content for display at both a presence-sensitive display 122 that is coupled to computing device 120 by communication channel 134A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 120 and output for display at presence-sensitive display 122 may be different than graphical content display output for display at one or more remote devices.

Computing device 120 may send and receive data using any suitable communication techniques. For example, computing device 120 may be operatively coupled to external network 146 using network link 148A. Each of the remote devices illustrated in FIG. 6 may be operatively coupled to network external network 146 by one of respective network links 148B, 148C, and 148D. External network 146 may include network hubs, network switches, network routers, etc., that are operatively inter-coupled thereby providing for the exchange of information between computing device 120 and the remote devices illustrated in FIG. 6. In some examples, network links 148A-148D may be Ethernet, ATM or other network connections. Such connections may be wireless and/or wired connections.

In some examples, computing device 120 may be operatively coupled to one or more of the remote devices included in FIG. 6 using direct device communication 150. Direct device communication 150 may include communications through which computing device 120 sends and receives data directly with a remote device, using wired or wireless communication. That is, in some examples of direct device communication 150, data sent by computing device 120 may not be forwarded by one or more additional devices before being received at the remote device, and vice-versa. Examples of direct device communication 150 may include Bluetooth, Near-Field Communication, Universal Serial Bus, WiFi, infrared, etc. One or more of the remote devices illustrated in FIG. 6 may be operatively coupled with computing device 120 by communication links 154A-154D. In some examples, communication links 154A-154D may be connections using Bluetooth, Near-Field Communication, Universal Serial Bus, infrared, etc. Such connections may be wireless and/or wired connections.

In accordance with techniques of the disclosure, computing device 120 may be operatively coupled to mobile device 130 using external network 146. Computing device 120 may output for display at presence-sensitive display 142, a graphical keyboard comprising a plurality of keys. For instance, computing device 120 may send data that includes a representation of the graphical keyboard to communication unit 124. Communication unit 124 may send the data that includes the representation of the graphical keyboard to mobile device 130 using external network 146. Mobile device 130, in response to receiving the data using external network 146, may cause presence-sensitive display 142 to output the graphical keyboard. In response to a user providing an input at presence-sensitive display, mobile device 130 may send an indication of the input to computing device 120 using external network 146. Communication unit 124 of may receive the indication of the gesture, and send the indication to computing device 120.

In response to receiving the gesture, computing device 120 may determine an input posture of the input, wherein the input posture represents an orientation of the computing device in relation to an input unit used to provide the input. Computing device 120 may determine, based at least in part on the input posture and by the computing device, a spatial model that is used for determining a probability that at least one of the one or more of the plurality of keys has been selected. Computing device 120 may output for display, a candidate word that is determined based at least in part on the spatial model. For instance, computing device 120 may send data representing the candidate word to communication unit 124. Communication unit 124 may send the data to mobile device 130 via external network 146. Mobile device 130 may cause presence-sensitive display 142 to output the at least one word represented by the data.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Various embodiments of the invention have been described. These and other embodiments are within the scope of the following claims.

The invention claimed is:

1. A method comprising:
   outputting, by a computing device and for display, a graphical keyboard comprising a plurality of keys;
   receiving, by the computing device, an indication of current input detected at a presence-sensitive display operatively coupled to the computing device;
   determining, by the computing device, a distance between a first location on the presence-sensitive display at which a key of the graphical keyboard is output and a second location of the presence-sensitive display at which the current input was detected;
   determining, by the computing device, an elapsed time between a first time that a previous input was detected at the presence-sensitive display a second time that the current input was detected at the presence-sensitive display, the first time occurring before the second time;
   determining, by the computing device, based at least in part on the distance and the elapsed time, that an input posture type of the previous and current inputs is a single-finger input posture type or a bimodal input posture type; and
   selecting, by the computing device based at least in part on the input posture type, a spatial model that is used for determining a probability that at least one of the one or more of the plurality of keys has been selected.

2. The method of claim 1, wherein determining the spatial model further comprises:
   generating, by the computing device based at least in part on the input posture type, a search key;
   searching, by the computing device, based at least in part on the search key, a hierarchical spatial model comprising one or more sub-models, the at least one spatial model being a sub-model of the hierarchical spatial model; and
   selecting, by the computing device, based at least in part on the search, the at least one spatial model.

3. The method of claim 2, wherein the search key is a hash key, and wherein generating the search key is further generated based at least in part on one or more of an identifier of a key of the graphical keyboard and an identifier of a user of the computing device.

4. The method of claim 2, further comprising:
   determining, by the computing device, a probability that indicates the input posture type is one of a plurality of input posture types; and
   wherein the input posture type is determined responsive to determining that the probability satisfies a threshold.

5. The method of claim 1, further comprising:
   determining, by the computing device, based at least in part on the at least one spatial model, a spatial model score that indicates a probability a key of the plurality of keys has been selected;
   determining, by the computing device, based at least in part on the spatial model score, a word included in a lexicon; and
   outputting, by the computing device, for display, the word.

6. A non-transitory computer-readable storage medium encoded with instructions that, when executed, cause one or more processors of a computing device to perform operations comprising:
   outputting for display, a graphical keyboard comprising a plurality of keys;
   receiving an indication of a current input detected at a presence-sensitive display operatively coupled to the computing device;
   determine a distance between a first location on the presence-sensitive display at which a key of the graphical keyboard is output and a second location of the presence-sensitive display at which the current input was detected;
   determine an elapsed time between a first time that a previous input was detected at the presence-sensitive display a second time that the current input was detected at the presence-sensitive display, the first time occurring before the second time;
   determining, based at least in part on the distance and the elapsed time, that that an input posture type of the previous and current inputs is a single-finger input posture type or a bimodal input posture type; and
   select, based at least in part on the input posture type, a spatial model that is used for determining a probability that at least one of the one or more of the plurality of keys has been selected.

7. The non-transitory computer-readable storage medium of claim 6, wherein the instructions, when executed, further cause the one or more processors of the computing device to:
   generate, based at least in part on the input posture type, a search key;
   search, based at least in part on the search key, a hierarchical spatial model comprising one or more sub-models, the at least one spatial model being a sub-model of the hierarchical spatial model; and
   select, based at least in part on the search, the at least one spatial model.

8. The non-transitory computer-readable storage medium of claim 7, wherein the instructions, when executed, further cause the one or more processors of the computing device to:
   generate the search key based at least in part on one or more of an identifier of a key of the graphical keyboard and an identifier of a user of the computing device.

9. The non-transitory computer-readable storage medium of claim 7, wherein the instructions, when executed, further cause the one or more processors of the computing device to:
   determine a probability that that indicates the input posture type is one of a plurality of input posture types; and
   select the input posture type responsive to determining that the probability satisfies a threshold.

10. The non-transitory computer-readable storage medium of claim 6, wherein with instructions, when executed, further cause the one or more processors of the computing device to:
    determine, based at least in part on the at least one spatial model, a spatial model score that indicates a probability a key of the plurality of keys has been selected;
    determine, based at least in part on the spatial model score, a word included in a lexicon; and
    output, for display, the word.

11. A computing device comprising at least one processor, wherein the at least one processor is configured to:
    output for display, a graphical keyboard comprising a plurality of keys;
    receive an indication of a current input detected at a presence-sensitive display;
    determine a distance between a first location on the presence-sensitive display at which a key of the graphical keyboard is output and a second location of the presence-sensitive display at which the current input was detected;
    determine an elapsed time between a first time that a previous input was detected at the presence-sensitive display a second time that the current input was detected at the presence-sensitive display, the first time occurring before the second time;
    determine, based at least in part on the distance and the elapsed time, that an input posture type of the previous and current inputs is a single-finger input posture type or a bimodal input posture type; and
    select, based at least in part on the input posture type, a spatial model that is used for determining a probability that at least one of the one or more of the plurality of keys has been selected.

12. The computing device of claim 11, wherein the at least one processor is further configured to:
    generate, based at least in part on the input posture type, a search key;
    search, based at least in part on the search key, a hierarchical spatial model comprising one or more sub-models, the at least one spatial model being a sub-model of the hierarchical spatial model; and
    select, based at least in part on the search, the at least one spatial model.

13. The computing device of claim 12, wherein the at least one processor is further configured to:

generate the search key based at least in part on one or more of an identifier of a key of the graphical keyboard and an identifier of a user of the computing device.

14. The computing device of claim 11, wherein the at least one processor is further configured to:
- determine a probability that that indicates the input posture type is one of a plurality of input posture types; and
- select the input posture type responsive to determining that the probability satisfies a threshold.

15. The computing device of claim 11, wherein the at least one processor is further configured to:
- determine, based at least in part on the at least one spatial model, a spatial model score that indicates a probability a key of the plurality of keys has been selected;
- determine, based at least in part on the spatial model score, a word included in a lexicon; and
- output for display, the word.

* * * * *